United States Patent
Desai

(10) Patent No.: US 9,736,587 B2
(45) Date of Patent: Aug. 15, 2017

(54) SMART TOOL FOR HEADPHONES

(71) Applicant: QUALCOMM Incorporated, San Diego, CA (US)

(72) Inventor: Vishruti R. Desai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 13/958,900

(22) Filed: Aug. 5, 2013

(65) Prior Publication Data

US 2014/0064511 A1 Mar. 6, 2014

Related U.S. Application Data

(60) Provisional application No. 61/695,528, filed on Aug. 31, 2012.

(51) Int. Cl.
| | |
|---|---|
| *H04B 3/00* | (2006.01) |
| *H04R 3/12* | (2006.01) |
| *H04M 3/487* | (2006.01) |
| *H04R 1/10* | (2006.01) |
| *H04L 12/18* | (2006.01) |
| *H04W 4/06* | (2009.01) |
| *H04R 27/00* | (2006.01) |

(52) U.S. Cl.
CPC ............ *H04R 3/12* (2013.01); *H04M 3/4872* (2013.01); *H04R 1/1041* (2013.01);
(Continued)

(58) Field of Classification Search
CPC ............... H04L 12/189; H04L 12/1859; H04L 12/1895; H04W 4/02; H04W 4/06;
(Continued)

(56) References Cited

U.S. PATENT DOCUMENTS 6,813,777 B1 11/2004 Weinberger et al.
8,224,397 B2 7/2012 Espersen et al.
(Continued)

FOREIGN PATENT DOCUMENTS

EP 2385480 A1 11/2011
WO 0161987 A2 8/2001

OTHER PUBLICATIONS

"pause, v.1." OED Online. Oxford University Press, Dec. 2015. Web. Feb. 17, 2016.*
(Continued)

*Primary Examiner* — Duc Nguyen
*Assistant Examiner* — Kile Blair
(74) *Attorney, Agent, or Firm* — Espartaco Diaz Hidalgo

(57) ABSTRACT

Systems, methods, and devices of the various embodiments enable headphone users to he hear audible announcements of relevance to the user. In the various embodiments, a user device, such as headphones, may receive an announcement, determine whether the announcement is of interest to the user, and pause the current audio output by the headphones and enable the user to hear the announcement. In an embodiment, an announcement system may transmit announcements audibly and via a wireless channel, for example via broadcast and/or multicast transmission, to enable user devices to receive announcements and play relevant announcements via the headphones. In another embodiment, an announcement system may embedded announcement identifiers within audible announcements to enable a user device to identify announcements of interest. In another embodiment, a user device may filter received audio to identify announcements of interest to the user based on recognized subject matter within the received audio.

32 Claims, 27 Drawing Sheets

(52) U.S. Cl.
CPC .......... *H04L 12/1895* (2013.01); *H04R 27/00* (2013.01); *H04R 2420/07* (2013.01); *H04W 4/06* (2013.01)

(58) Field of Classification Search
CPC ..... H04W 4/08; H04M 3/4874; H04M 3/487; H04M 3/4872; H04M 3/53375; H04R 27/00; H04R 2420/03; H04R 2420/07; H04B 5/02; H04B 5/04
See application file for complete search history.

(56) References Cited

U.S. PATENT DOCUMENTS

| | | | |
|---|---|---|---|
| 8,345,663 | B2 | 1/2013 | Brady, Jr. et al. |
| 8,660,604 | B2* | 2/2014 | Rofougaran ......... H04B 5/0006 455/183.1 |
| 2008/0037718 | A1* | 2/2008 | Logan .................... G04G 13/02 379/67.1 |
| 2008/0108328 | A1 | 5/2008 | Lovell |
| 2009/0111378 | A1 | 4/2009 | Sheynman et al. |
| 2010/0105331 | A1 | 4/2010 | Buehler et al. |
| 2010/0221992 | A1 | 9/2010 | Coto-Lopez |
| 2011/0095876 | A1 | 4/2011 | Tanaka |
| 2012/0021729 | A1 | 1/2012 | Tuerk et al. |
| 2012/0169454 | A1 | 7/2012 | Petersen et al. |
| 2012/0281856 | A1 | 11/2012 | Georgiou et al. |

OTHER PUBLICATIONS

International Search Report and Written Opinion—PCT/US2013/057851, International Search Authority—European Patent Office, Dec. 6, 2013.

* cited by examiner

SMART TOOL FOR HEADPHONES

RELATED APPLICATIONS

This application claims the benefit of priority to U.S. Provisional Patent Application No. 61/695,528 entitled "Smart Tool for Headphones" filed Aug. 31, 2012, the entire contents of which are hereby incorporated by reference.

BACKGROUND

Currently, when an individual is wearing headphones and listening to audio, such as music and/or media soundtracks, he or she may be unable to hear sounds external to the headphones, such as paging announcements in public places. As an example, if a person is waiting for a flight at an airport gate and she is listening to music through headphones, she may not hear an announcement made over the airport's public address system. Currently, she is required to remove her headphones and/or stop the playing of her music to listen to announcements. If she does not remove her headphones she may miss important announcements, such as gate and/or ticketing changes, flight delays, emergency information, etc.

As another example, currently if a person is working at his desk wearing headphones and listening to audio, such as a webcast, as part of his work, he may not hear an announcement made by his workplace's announcement system. Thus, listening to audio using headphones may prevent him from hearing other important workplace announcements made over the workplace announcement system.

The inability to hear external announcements while using headphones may also be a problem in environments where headphones are used to drown out background noise, such as industrial work environments. In such environments, workers wearing headphones to drown out external noise may also not hear important announcements.

SUMMARY

The systems, methods, and devices of the various embodiments enable headphone users to hear external audible announcements. In the various embodiments, a user device, such as headphones and/or a mobile device connected to headphones, may receive an announcement, determine whether the announcement is of interest to the user, and pause the current audio output or play the announcement through the headphones to enable the user to hear announcements of interest to the user. In an additional embodiment, in addition to pausing the current audio output, video output by a user device may also be paused while playing the announcement. In an embodiment, an announcement system may transmit announcements audibly and via a wireless (e.g., Wi-Fi) channel, for example via broadcast and/or multicast transmission, to enable user devices to receive announcements and play relevant announcements via the headphones. In another embodiment, an announcement system may embed announcement identifiers within audible announcements to enable a user device to identify from the embedded announcement identifier those announcements of interest so that audio played through the headphones is suspended so the user can hear the announcement. In an embodiment, information that will enable the user devices to recognize relevant announcements may be transmitted via short range transmitters, such as Bluetooth, NFC and RFID protocols, and user devices may use the received information to determine whether announcements received over a wireless channel or audibly should be heard by the user. In yet another embodiment, a user device (e.g., headphones or a device coupled to the headphones) may filter received sounds to identify announcements of interest to the user based on recognized subject matter within the received audio, and the replay announcements identified as being of interest to the user through the headphones.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
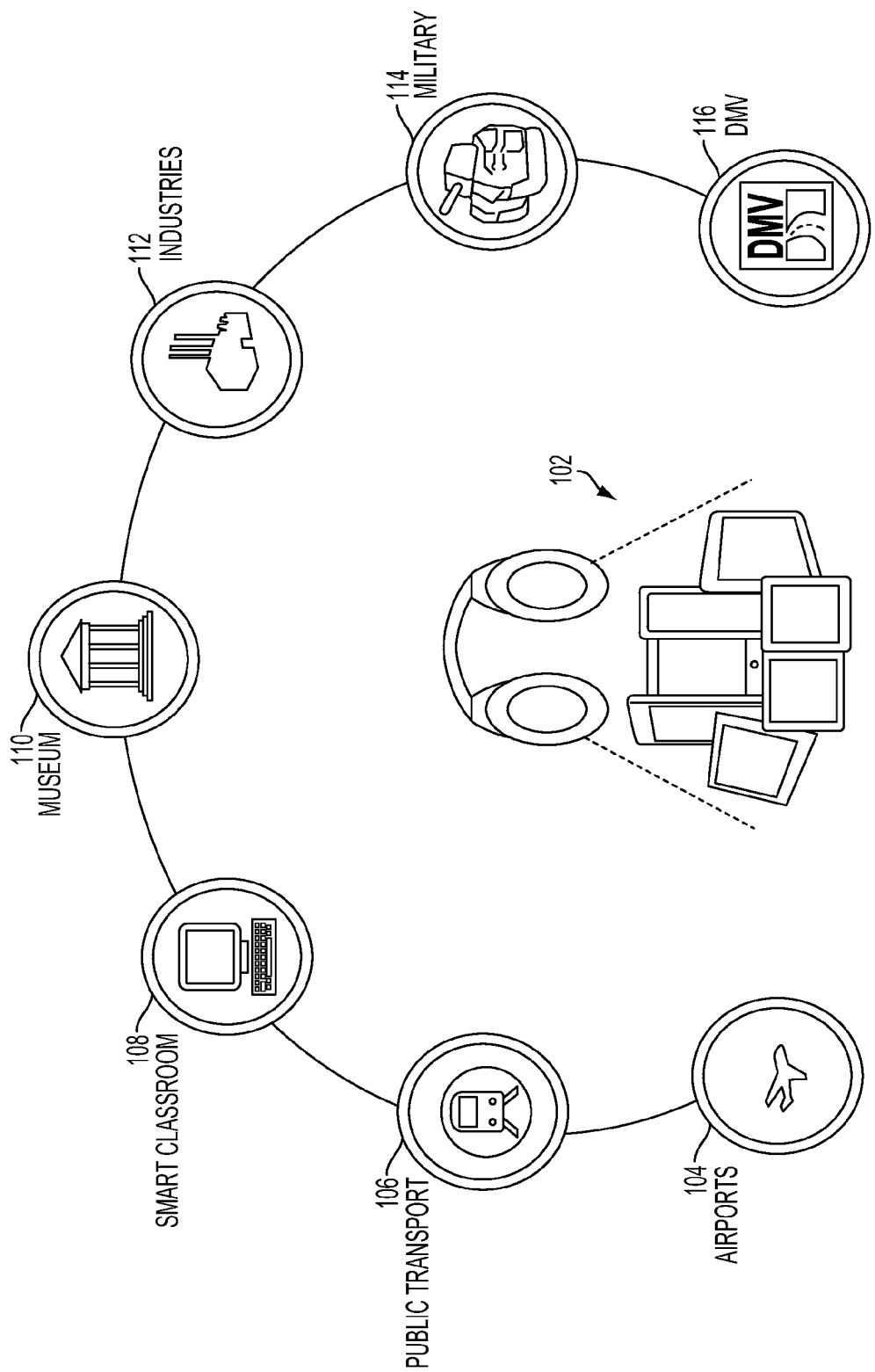
FIG. 1 is a block diagram illustrating various environments in which the various embodiments may be useful.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, music players, e-Readers, and similar personal electronic devices which include a programmable processor and memory and circuitry for generating audio data and providing the audio data to headphones for output via one or more speakers of the headphones.

As used in the specification and claims the terms "headphones", "headphone", and "a set of headphones" are used interchangeably to refer to any device configured to be worn by a on or near the ear(s) of a user which output sound to the user's ear(s). One or more speakers or other audio generation devices may be components of "headphones", "headphone", and "a set of headphones."

As used in the specification and claims the term "barcode" refers to any image-encoded representation of data intended to be optically scanned by a device to obtain an indication of the data encoded in the representation. A barcode may be liner or multidimensional. Example barcodes include, but are not limited to, linear barcodes, Quick Response Codes ("QR codes"), and High Capacity Color barcodes.

The various embodiments enable headphone users to hear external audible announcements that are of interest to them. This may be accomplished in a number of different embodiments.

In an embodiment, audible announcements made over a public address system may also be converted into audio data packets and sent via Wi-Fi (or other wireless data link) to user devices, such as headphones and/or mobile devices connected to headphones. The user device may receive the audio data packets via the wireless data link, determine whether the announcement is pertinent or of interest to the user and should be presented to the user, and use the received audio data packets to play the audible announcement through the headphones. The wireless data link used to transmit audio data packets may be local (e.g., within an area where the announcement may be of relevance), wide area (e.g., a Wi-Fi signal transmitted (e.g., broadcast and/or multicast) throughout a facility) or cellular (e.g., a cellular data link to an Internet website where announcements may be posted). In an embodiment, a user device, such as headphone and/or a mobile device connected to headphones, may be configured with short range communications receiver, such a Near Field Communication ("NFC") or Radio Frequency Identification ("RFID") receiver, to receive short range communications, such as NFC and/or RFID communications. Codes or information regarding a Wi-Fi channel (e.g., a hidden SSID) or identification codes included within the headers of audio data packets may be transmitted over such short range communications. An example of such a code is a hidden service set identifier (hidden SSID). Such included codes and information may enable the headphones and/or a mobile device to recognize from such codes or information whether an announcement should be played for the user. This capability enables facilities, such as airports, to inform user devices of public address announcements that are relevant to particular locations, such as a particular gate in an airport.

In another embodiment, a user device, such as headphones and/or a mobile device connected to headphones, may receive external noise through a microphone, process the received noise to recognize announcements, determine from the announcement whether the announcement is pertinent or of interest to the user and should be presented to the user, and either suspend audio play to enable the user to hear the announcement or replay the received announcement through the headphones. In this embodiment, the headphones and/or mobile device may include audio processing chips which are capable of processing noise received from a microphone to recognize information encoded within the sound or to convert the announcement into text which can be analyzed for subject matter content. In an embodiment in which information regarding an announcement is encoded within the audible sound, the headphones and/or mobile device may be able to suspend playing of the audio stream, and turned off noise suppression circuitry if present, so that the user can hear the announcement. Additionally or alternatively, the headphones and/or mobile device may record announcements so that they may be replayed over the headphones once their relevance to the user is determined from the information encoded within the sound. In this embodiment, information regarding announcements that is encoded within the audible sound may be communicated to headphones and/or mobile devices via NFC or RFID data links as described above.

In another embodiment, the headphones and/or mobile device may be configured with audio processing circuits that convert an audible announcement into text and analyze it for subject matter content. The headphones and/or mobile device may record the announcement while it is being analyzed for subject matter. The headphones and/or a mobile device may then analyze the subject matter to determine whether the announcement is relevant or of interest to the user, and if so, the headphones may replay the announcement stored in memory.

In a further embodiment, user interface functions may be implemented within the headphones and/or mobile device to enable a user to control settings and/or identify announcements or subject matter of interest.

FIG. 1 is a block diagram illustrating various environments, such as airports 104, public transportation environments 106, smart classrooms 108, museums 110, industrial environments 112, military environments 114, and government service environments 116, in which the various embodiments may enable headphone connected user devices 102 to receive external audible announcements. As an example, in an airport environment 104 the various embodiments may enable the user of a headphone connected user device 102 to receive gate announcements for his or her specific gate even though the user may be listening to music while wearing headphones. As another example, in a public transportation environment 106 the various embodiments may enable the user of a headphone connected user device 102 to receive approaching stop announcements for his or her specific stop even though the user may be listening to an audio book while wearing headphones. As another example, in a smart classroom 108 the various embodiments may enable the user of a headphone connected user device 102 to receive teacher announcements for his or her specific class even through the user may be watching a video and listening to the video's audio while wearing headphones. As yet another example, in a museum 110 the various embodiments may enable the user of a headphone connected user device 102 to receive specific information about a painting he or she stepped close to even though the user may be listening to a general audio tour for the overall gallery while wearing headphones. As a further example, in an industrial environment 112 the various embodiments may enable the user of a headphone connected user device 102 to receive emergency public address announcements even though the user may be wearing noise canceling headphones. As another example, in a military environment 114 the various embodiments may enable the user of a headphone connected user device 102 to receive announcements from a vehicle's internal announcement system even though the user may be listening to radio communications through the headphones. In a government service environment 116, such as a department of motor vehicles licensing center, the various embodiments may enable the user of a headphone connected user device 102 to receive and announcement that it is his or her turn to approach the counter even though the user may be listening to loud music or the audio of a phone call via headphones.

Figure 2:
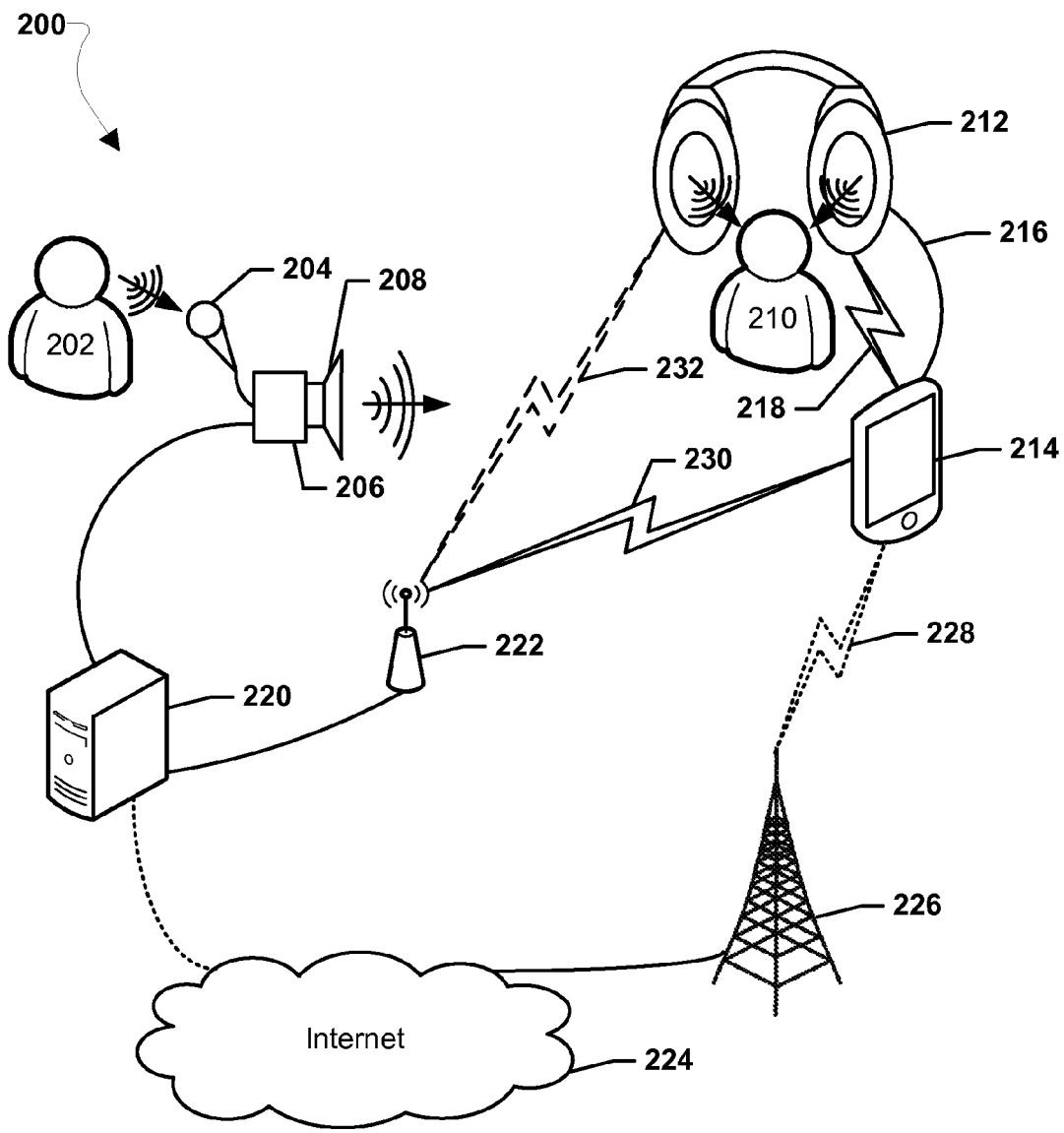
FIG. 2 is a communication system block diagram of an announcement system suitable for use with the various embodiments.

FIG. 2 illustrates a communication system 200 suitable for use with the various embodiments. The communication system 200 may include an audible announcement system 206, such as a public address system, which may include a microphone 204 for receiving an announcement, such as a spoken announcement, from an announcer 202, for example a gate agent in an airport. In an embodiment, the audible announcement system 206 may receive the announcement from the announcer 202 via the microphone 204 and may play an audible announcement via one or more speakers 208 connected to the audible announcement system 206. In an embodiment, an individual user 210 may be wearing headphones 212 and listening to audio output from the headphones 210, such as music, phone call audio, video audio tracks, etc. The headphones 212 may be connected to a mobile device 214, such as a smart phone, via a wired connection 216, such as a USB connection, standard audio connection, etc. Alternatively, the headphones 212 may be connected to the mobile device 214 by a wireless connection 218, such as a Bluetooth® connection. The headphones 210 may include noise canceling circuitry which cancel out external noises, and thus may interfere with the individual user's 210 ability to hear audible announcements unless they have played through the headphones as provided in the various embodiments. While illustrated as separate devices, the mobile device 212 and headphones 212 may be one device, such as self contained audio playing headphones that do not need to connect to another device to play audio, such as AM/FM radio headphones.

The functionality of the various embodiments may be implemented using two basic types of architectures. A first embodiment architecture includes the use of wireless networks, which may be included as part of the public address system, that transmit announcements by radio wireless data links, such as WiFi. This architecture enables suitably equipped mobile devices and/or headphones to receive announcement by wireless link, and then play them through the headphones if determined to be of relevance to a user. This embodiment requires modifications to facilities to add the additional wireless data link transmitters. A second embodiment architecture does not involve a wireless data link, and instead determines from the audible announcements themselves whether they are relevant and thus should be heard by the user. This architecture includes sound processing circuits and software modules implemented within the headphones and/or mobile devices to recognize announcements, determine their relevance, and enable the user to hear those deemed to be relevant.

In an embodiment, the audible announcement system 206 may be connected to an announcement server 220, for example by a network, such as an Ethernet. The announcement system 206 may convert the audio received from the microphone 204 into audio data packets and may send the audio data packets to the announcement server 220. While illustrated as separate devices, in an alternative embodiment, the announcement system 206 and the announcement server 220 may be the same device, for example the same server.

In an embodiment, the announcement server 220 may be connected to a wireless access point 222, such as a Wi-Fi access point. In an embodiment, the announcement server 220 may receive the audio data packets for the announcement and may transmit (e.g., via broadcast and/or multicast transmission) the audio data packets for the announcement via the wireless access point 222. In an embodiment, the announcement server 220 may add a header to the audio data packets indicating subject matter, announcer 202 information, announcement type information, and/or other information, for example gate information in an airport environment, to the audio data packets when transmitting the audio data packets for the announcement. In an embodiment, the mobile device 214 may receive the audio data packets for the announcement and any included header information via a wireless connection 230, such as a Wi-Fi connection, with the wireless access point 222. In an embodiment, the mobile device may output the received audio data packets for the announcement via the headphones 212. In an optional embodiment, the headphones 212 may be enabled to establish a wireless connection 232, such as a Wi-Fi connection with the wireless access point 222 in addition to or in place of the wireless connection 230 made by the mobile device 214, and the headphones 212 may receive the audio data packets for the announcement and any included header information via the wireless connection 232. In such an embodiment, the headphones 212 may output audio corresponding to the received audio packets 212 independent of the mobile device 214.

In another optional embodiment, the announcement server 220 may be connected to the Internet 224. The mobile device 214 may communicate with a cellular data network 226 (e.g., CDMA, TDMA, GSM, PCS, G-3, G-4, LTE, or any other type of cellular data network) that may be connected to the Internet 224. In this manner, data (e.g., audio data packets, etc) may be exchanged between the announcement server 220 and the mobile device 214 by any of a variety of communication networks. In an embodiment, the announcement server 220 may push the audio data packets to the mobile device 214 via the Internet 224 and cellular data network 226.

Figure 3:
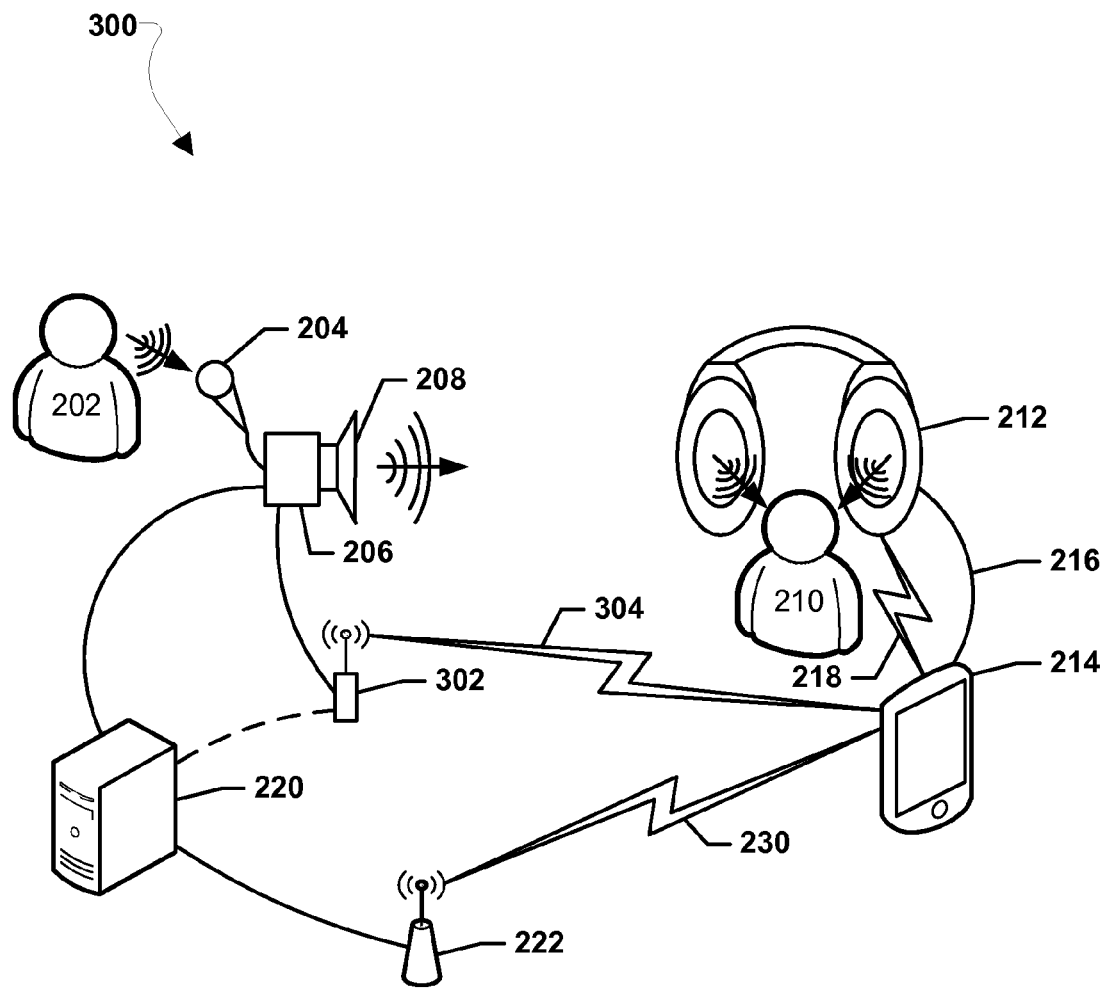
FIG. 3 is a communication system block diagram of another announcement system suitable for use with the various embodiments.

FIG. 3 illustrates a communication system 300 similar to communication system 200 described above with reference to FIG. 2, except that in FIG. 3 the mobile device 214 may receive a short range wireless communication transmission 304, such as an NFC transmission, RFID transmission, ZIGBee transmission, Peanut transmission, etc., with a short range wireless transceiver 302, such as a NFC transceiver, RFID transceiver, ZIGBee transceiver, Peanut transceiver, etc. In an embodiment, the short range wireless transceiver 302 may be connected to the announcement system 206. In an optional embodiment, the short range wireless transceiver 302 may be connected to the announcement server 220.

In an embodiment, the short range wireless transceiver 302 may transmit information to enable relevant announcements to be identified by mobile devices and/or headphones. In an embodiment, the short range transceiver 302 may transmit information identifying a specific wireless access point 222 from which to receive announcement audio data packets, such as a specific hidden SSID for a Wi-Fi access point over which announcements for a location will be transmitted. For example, in an airport each gate may be assigned its own hidden Wi-Fi SSID hotspot and a mobile device in a specific gate area may receive the hidden SSID information (i.e., the information needed to find and connect to the Wi-Fi network) for that gate via the short range transceiver 302.

In another embodiment, the short range transceiver 302 may transmit (e.g., via broadcast and/or multicast) an indication that an audible announcement is being made or will be made over the one or more speakers 208 of the announcement system 206. As an example, the short range transceiver 302 may transmit an interrupt or a wake-up command to the mobile device 214. In another embodiment, the short range transceiver 302 may transmit information identifying announcements from a specific location, such as an announcement ID, via the short range transceiver 302. As an example, the short range transceiver 302 may transmit the announcement ID for a specific gate or flight in an airport via the short range transceiver 302, and the mobile device 214 may use the received announcement ID to identify gate or flight specific messages based on the announcement ID in the header of audio packets received from the wireless access point 222.

Figure 4:
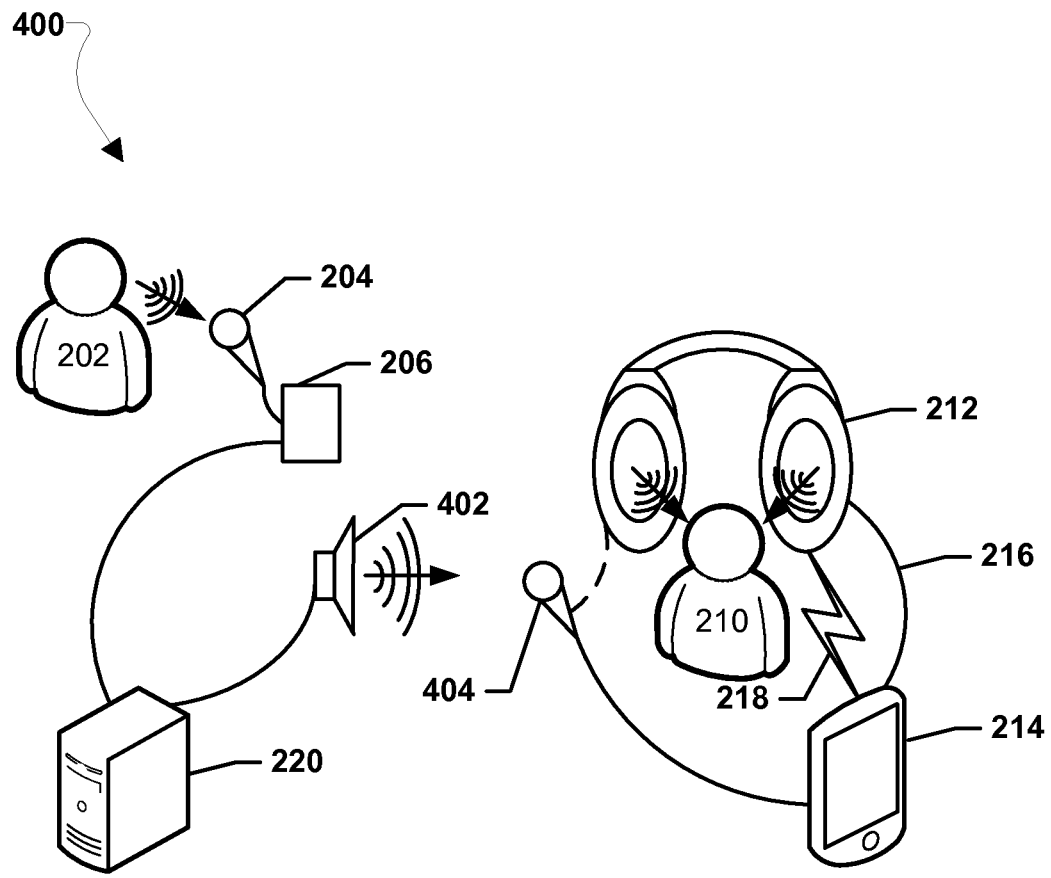
FIG. 4 is a communication system block diagram of a third announcement system suitable for use with the various embodiments.

FIG. 4 illustrates a communication system 400 similar to communication system 200 described above with reference to FIG. 2, except that in communication system 400 the wireless access point 222 may not be used to transmit audio packets to the mobile device. In communication system 400 the one or more speakers 402 may be connected to the announcement server 220. The announcement server 220 may receive the data packets corresponding to an announcement made by the announcer 202 and may generate an audible announcement using the received data packets via the one or more speakers 402. In an embodiment, the announcement server may also encode within the audible sound information related to the audio packets for the announcement. Thus, in this embodiment announcement-specific information, such as an announcement ID, wake-up indication, etc., may be encoded into the audible announcement as subsonic or ultrasonic signals that the mobile device 213 or headphones 212 can receive and decode. The mobile device 214 or the headphones 212 may include a microphone 404 with which to receive and record sound, such as the audible announcements. In an embodiment, the mobile device 214 and/or headphones 212 may isolate the audible announcements, decode any encoded audio information in the audible announcements or other audio signals, and record the audible announcements.

Figure 5:
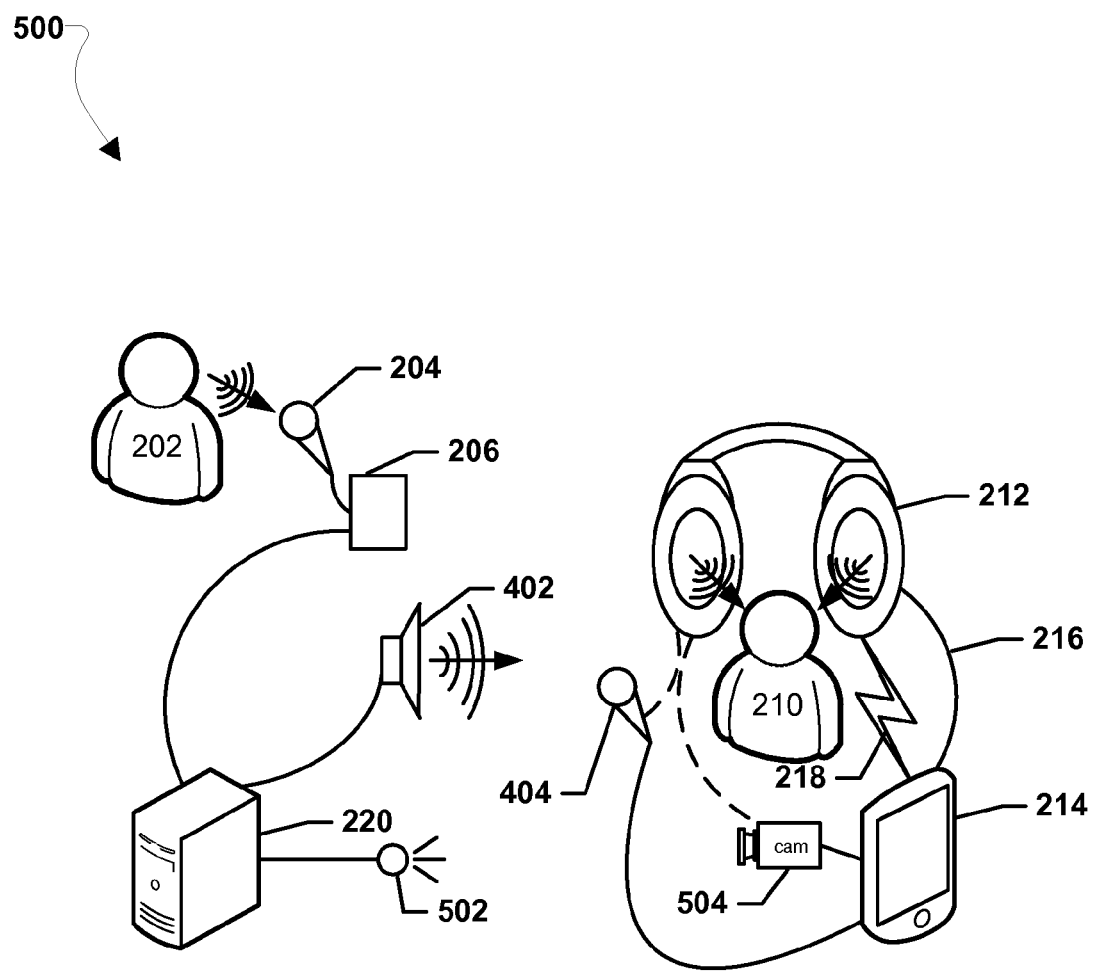
FIG. 5 is a communication system block diagram of a fourth announcement system suitable for use with the various embodiments.

FIG. 5 illustrates a communication system 500 similar to communication system 400 described above with reference to FIG. 4, except that in communication system 500 the mobile device 214 and/or headphones 212 may be connected to a light sensor 504, such as a photocell and/or camera, to receive light signals from a light signaling device 502, such as an LED, infrared light, or display connected to the announcement server 220. In an embodiment, the announcement server 220, may generate light signals via the light signaling device 502 when playing an audible indication via the one or more speakers 402. As an example, the light signaling device may be a flashing light, colored display, infrared data line (e.g., IRDA transmitter), etc., which may signal that a particular audible announcement is being played, encode information about the audible announcement (e.g., the announcement ID), and/or encode all or part of the announcement. The light sensor 504, may receive the light signals, and the mobile device 214 and/or earphones 212 may decode the light signals.

Figure 6:
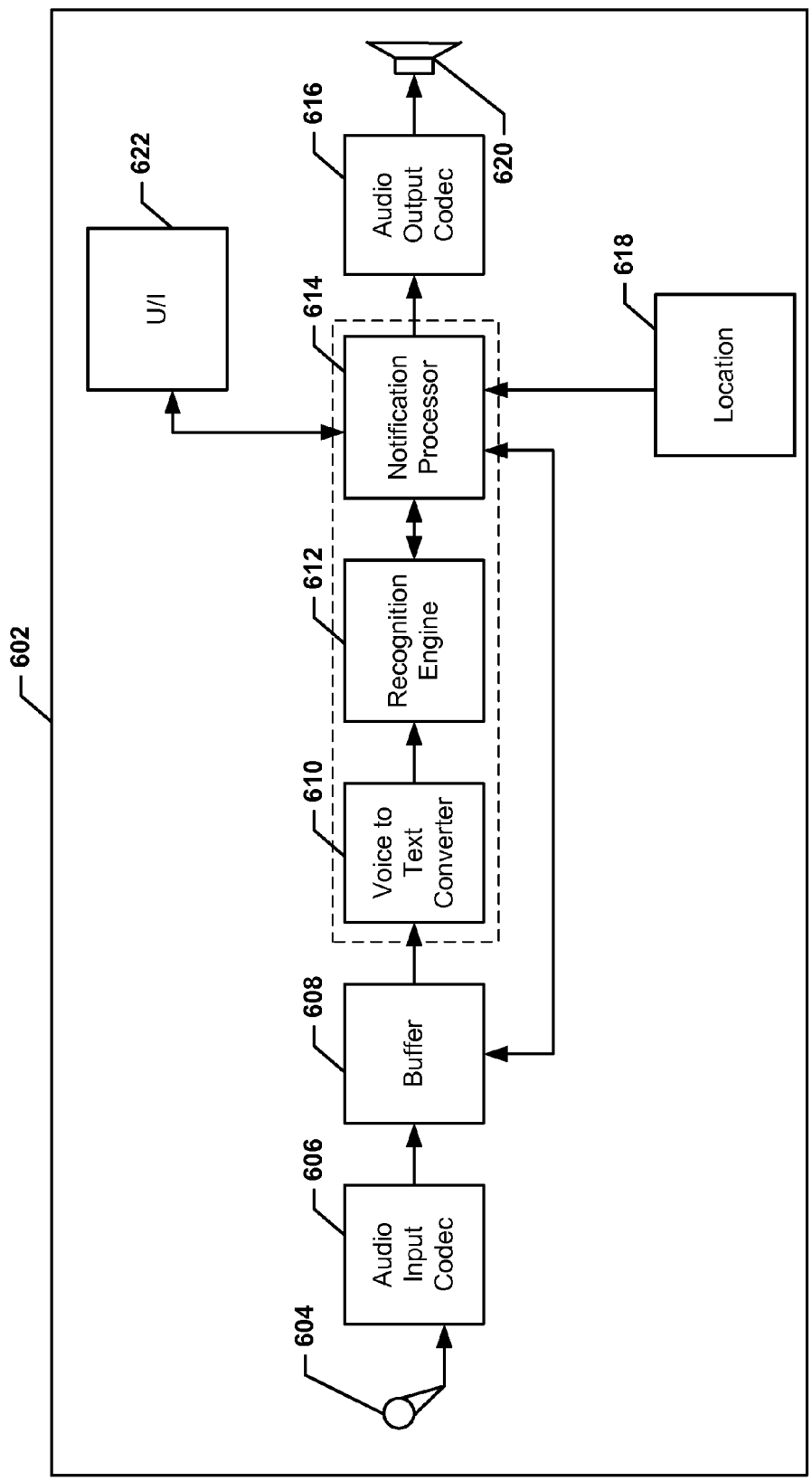
FIG. 6 is a block diagram of a user device according to an embodiment.

FIG. 6 is a component block diagram of a user device 602, such as a mobile device connected to headphones and/or headphones, according to an embodiment. The user device 602 may include a microphone 604 for converting sound waves incident on the microphone 604 to electrical signals input to an audio input codec 606. The audio input codec 606 may convert the electrical signals from the microphone 604 into audio data that is stored in a buffer 608. The audio data may be processed by a voice to text converter 610. The voice to text converter may be a processor, such as a digital signal processor (DSP), configured with processor executable instructions to perform operations of converting audio data from voice/speech waveforms into text. Known speech to text algorithms may be used for this purpose. The voice to text converter 610 generate text strings corresponding to the audio data and pass the text strings to a recognition engine 612. In an embodiment, the recognition engine 612 may be a software module of processor executable instructions executing within a processor configured to perform operations to analyze the text strings and identify words or phrases to identify the subject matter within the announcement. The recognition engine 612 may use natural language processing algorithms to recognize the parts of speech and the information being communicated. The recognition engine 612 may use the information obtained from such natural language processing to determine whether the announcement is of interest or relevance to the user, and thus should be presented to a user of the user device 602. In an embodiment, the notification processor 614 may be a processor configured with processor executable instructions to perform operations including receiving notification audio data including an indication of the announcement subject matter, determining whether the announcement should be presented to a user of the user device 602, recalling the audio data from the buffer 608, and playing the audio data through and audio output codec 616 and speaker 620 of the headphones. In other words, the audio output codec 616 converts the audio data recalled from the buffer into electrical signals that drive the speaker 620 to generate sound. In this manner, audio data including subject matter which may indicate the audio data should be presented to a user of the user device 602 may be audibly played for the user of the user device 602 via the speaker 620. In an embodiment, the speaker 620 may be a speaker of the device 602 itself, such as the one or more speakers in a pair of headphones, or may be the one or more speaker in a headphone connected to the user device via an audio connection to the audio output codec 616.

In an embodiment, the notification processor 614 may also prompt a user of the user device 602 via a user interface 622 to identify or select from a menu subject matter/announcements which are of interest to the user. In an embodiment, the mobile device or headphones may receive a list or database of subject matter or announcements that are anticipated to be made in the future that the mobile device or headphones can use to generate the list of selections posted on the user interface 622. Additionally, the notification processor 614 may receive location information, such as latitude and longitude coordinates, from a location sensor 618, such as a Global Positioning System receiver. In an embodiment, the notification processor 614 may provide the subject matter/announcement selections and/or the location information to the recognition engine 612 to enable the recognition engine 612 to identify relevant subject matter in the text strings generated by the speech to text converter 610.

While the various modules described above are illustrated as separate blocks, in an embodiment, the voice to text converter 610, the recognition engine 612, and the notification processor 614 may be one device, such as a single processor programmed with software modules, and thus is indicated by the dashed line.

Figure 7:
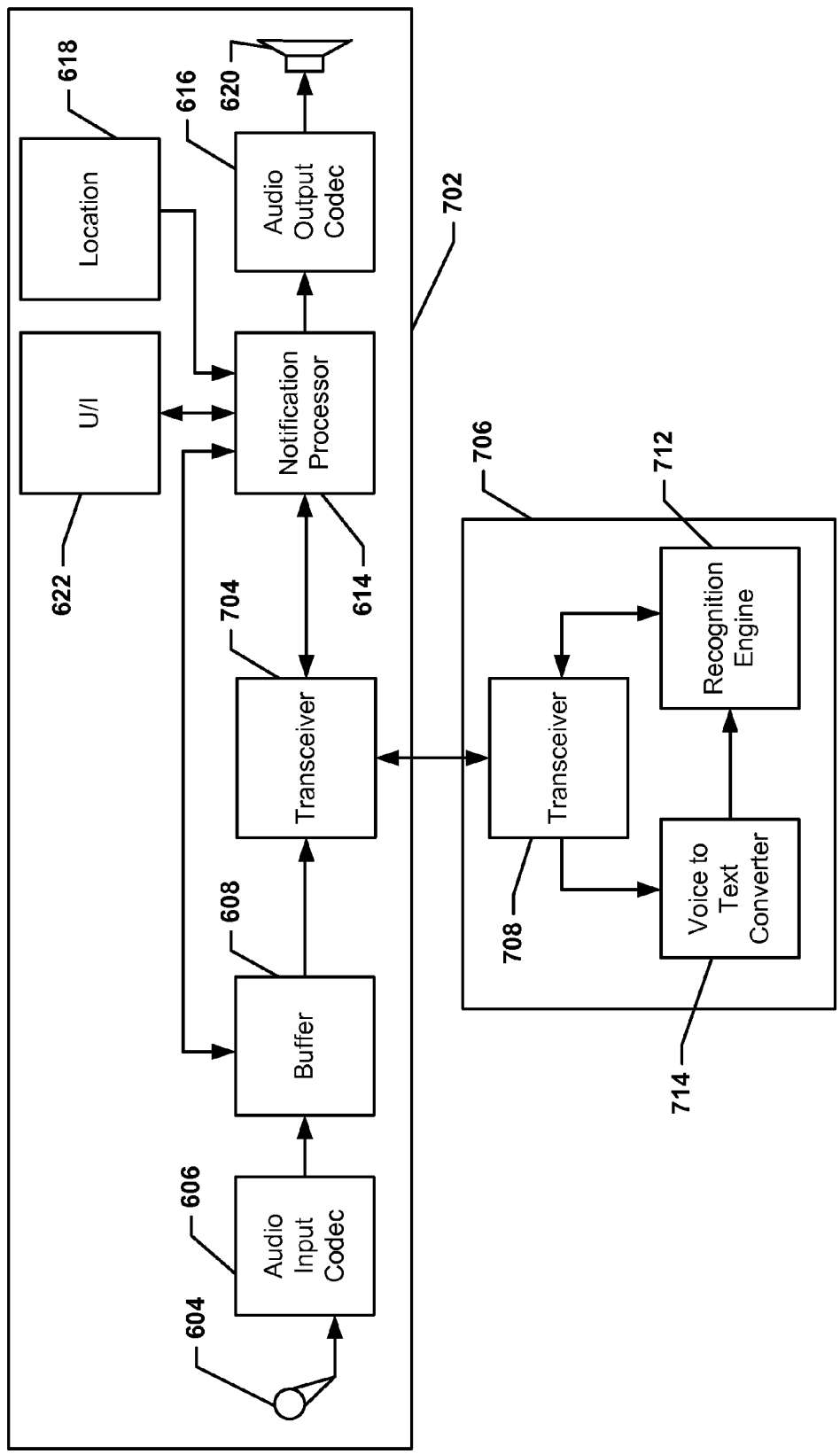
FIG. 7 is a block diagram of a user device and server system according to an embodiment.

FIG. 7 is a component block diagram of a user device 702 similar to user device 602 described above with reference to FIG. 6, except that user device 702 may transmit audio data to a server 706 via a transceiver 704 and the server 706 may include a voice to text converter 714 and recognition engine 712. The notification processor 614 may send subject matter/announcement selections and/or location data to the server 706 via the transceiver 704, and the audio data from the buffer 608 may be sent to the server 706 via the transceiver 704. In an embodiment, the transceiver 704 may be a wireless transceiver, such as a cellular (e.g., CDMA, TDMA, GSM, PCS, G-3, G-4, LTE, or any other type of cellular data network) transceiver. The server 706 may receive data from the user device 702 via its transceiver 708. In an embodiment, the transceiver 706 may be a wireless transceiver, such as a cellular (e.g., CDMA, TDMA, GSM, PCS, G-3, G-4, LTE, or any other type of cellular data network) transceiver. In an embodiment, the recognition engine 712 may receive the subject matter/announcement selections and/or location data from the transceiver 708, and the subject matter/announcement selections and/or the location information may enable the recognition engine 712 to identify relevant subject matter in text strings generated by the voice to text converter 714. The recognition engine may send an indication of audio data including relevant subject matter to the notification processor via the transceivers 708 and 704.

Figure 8:
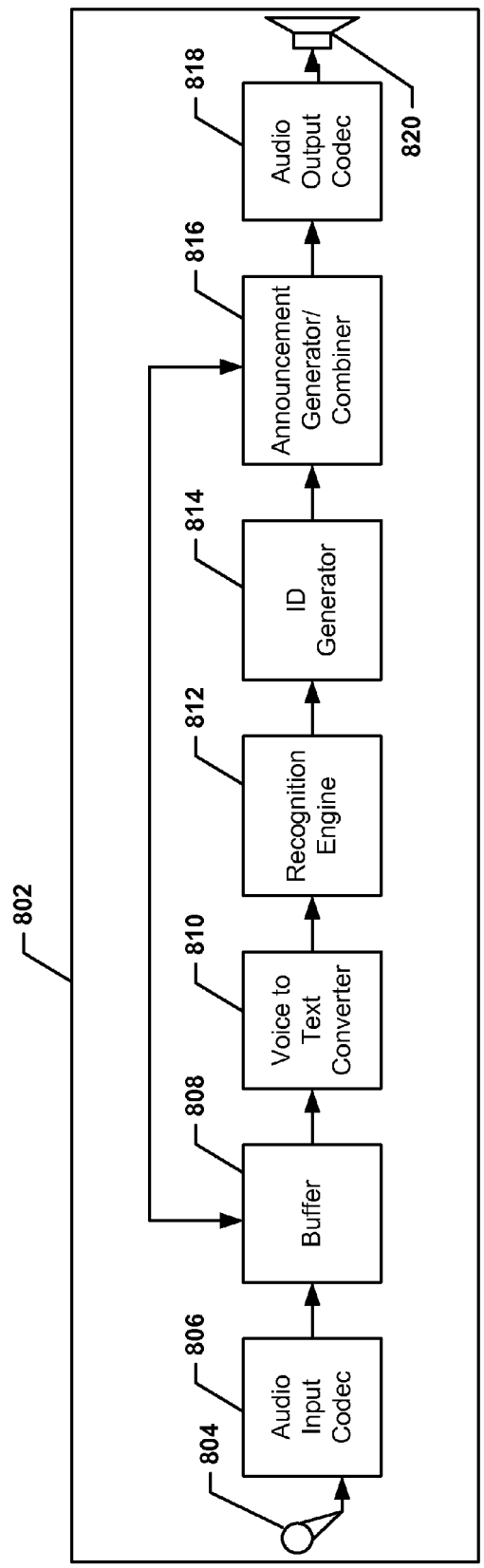
FIG. 8 is a block diagram of an announcement system according to an embodiment.

FIG. 8 is a component block diagram of an announcement system 802 according to an embodiment. In an embodiment, the announcement system 802 may include a microphone 804 for converting sound waves incident on the microphone 804 to electrical signals input to an audio input codec 806. In an embodiment, the sound waves may be the announcement made by an announcer using the announcement system 802. As an example, the announcer may be the gate agent of an airline making a boarding announcement for a flight. The audio input codec 806 may convert the electrical signals from the microphone 804 into audio data, which may be stored in a buffer 808. The audio data may be processed by a voice to text converter 810. In an embodiment, the voice to text converter 810 may be a processor configured with processor executable instructions to perform operations that convert voice/speech waveforms in the audio data to text, for example by using speech processing. The voice to text converter 810 generate text strings corresponding to the audio data and pass the text strings to a recognition engine 812. In an embodiment, the recognition engine 812 may be a processor configured with processor executable instructions to perform operations to analyze the text strings and identify words or phrases, such as using natural language processing, to identify the subject matter of the audio data. As an example, the recognition engine 812 may identify a flight number and/or gate number in an airport announcement. The recognition engine 812 may pass the identified subject matter to the ID generator 814 which may generate an announcement ID. In an embodiment, the ID generator may generate an announcement ID by comparing the identified subject matter to a data table correlating subject matter to announcement IDs and selecting the corresponding announcement ID for the identified subject matter. As an example, the subject matter may be a flight number and the ID generator may identify a unique announcement ID corresponding to that flight number. In an embodiment, the announcement ID may be pre-recorded audio data uniquely identifying an announcement. As an example, the announcement ID may be audio data of a high frequency encoding the flight number or other identifying information. The ID generator 814 may pass the announcement ID to the announcement generator/combiner 816. The announcement generator/combiner may retrieve the audio data from the buffer 808 corresponding to the announcement and may combine the announcement audio data with the announcement ID audio data and output the combined audio data to the audio output codec 818. The audio output codec 818 may convert the audio data to electrical signal to play the announcement and announcement ID via the speaker 820.

Figure 9:
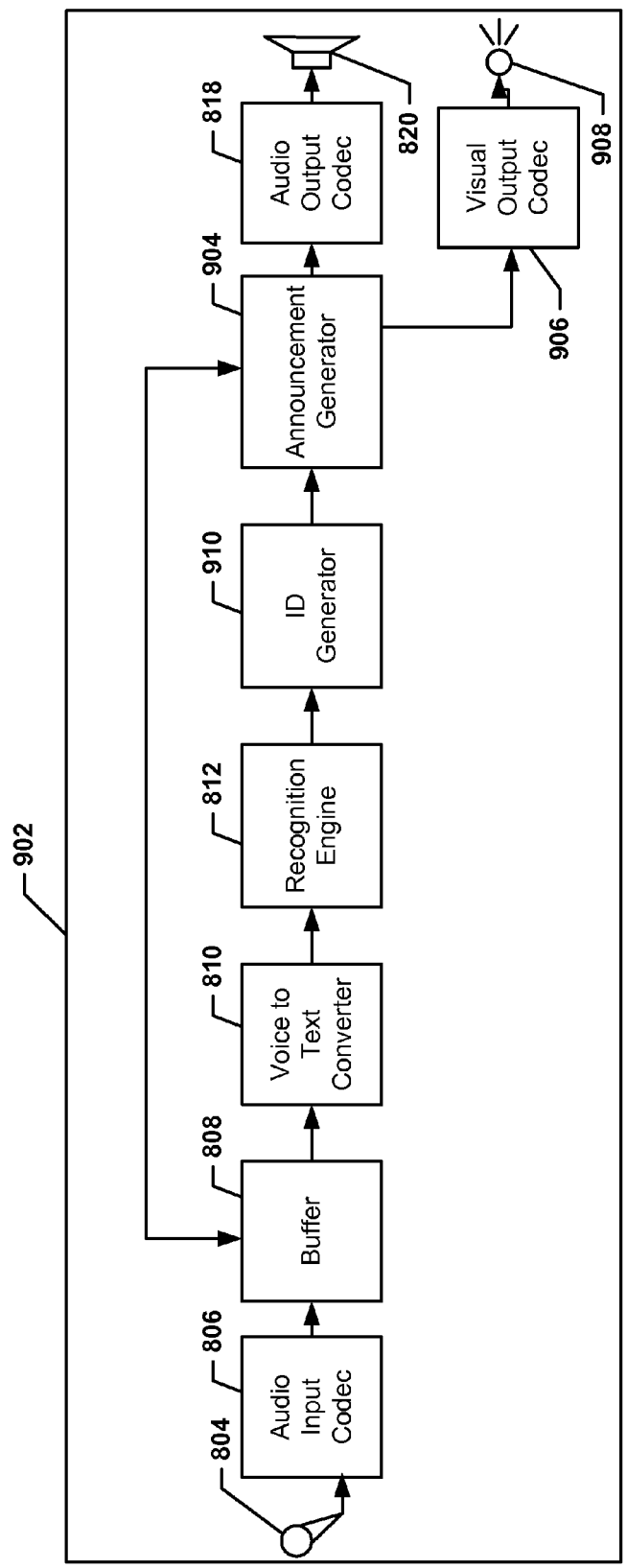
FIG. 9 is a block diagram of another announcement system according to an embodiment.

FIG. 9 is a component block diagram of an announcement system 902 similar to announcement system 802 described above with reference to FIG. 8, except that announcement system 902 includes a light signaling device 908. The ID generator 910 may identify an announcement ID for the subject matter from the recognition engine 812 corresponding to visual data, such as a light sequence, display graphic, etc. The ID generator 910 may provide the visual data to the announcement generator 904. The announcement generator 904 may send the visual data to the light signal encoder 906, which may convert the data into electrical signals to drive the light signaling device 908, such as a an IRDA emitter, blinking lights, display, etc. The announcement generator 904 may also retrieve the audio data from the buffer 808 and output the audio data to the audio output codec 818 and speaker 820.

Figure 10:
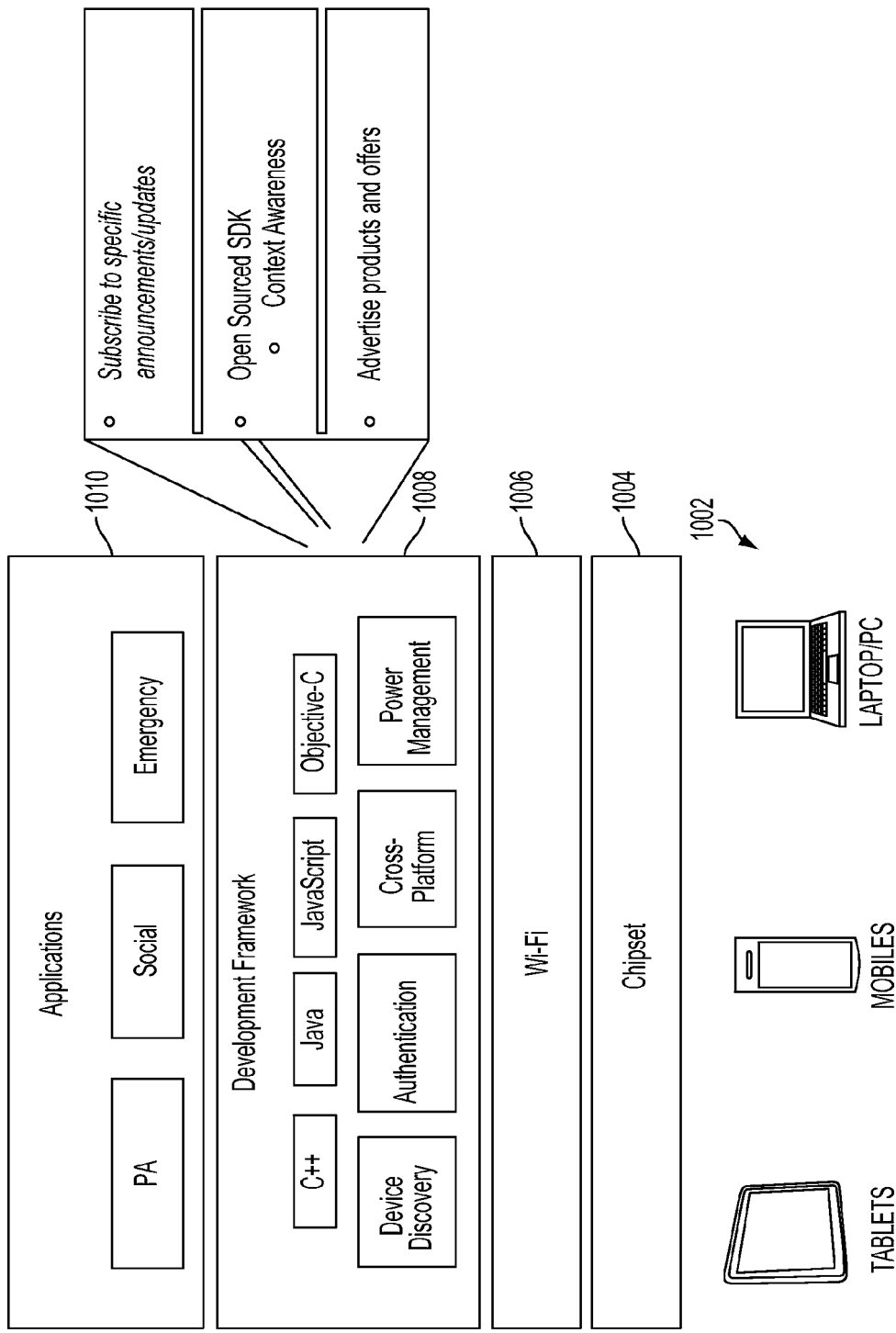
FIG. 10 is a data structure diagram of a user device according to an embodiment.

FIG. 10 is a data structure diagram of a potential user device 1002 architecture according to an embodiment. In an embodiment, the user device 1002 may include one or more chipset layers 1004 in communication with a Wi-Fi layer 1006. The application layer for a smart tool for headphones 1008 may include device discovery modules, authentication modules, cross-platform modules, and power management modules. The smart tool for headphones application 1008 may enable a user to subscribe to specific announcements/updates, may receive advertisements for products and offers, and may be associated with a development toolkit. Additionally, the smart tool for headphones application 1008 may have access to data on the user device 1002 enabling to the smart tool for headphones application 1008 to modify its operation based on the user's context, for example the user's calendar application. For example, the smart tool for headphones application 1008 may access a calendar application to determine the scheduled flight number for the user and may identify announcements related to that flight number. Additionally, the smart tool for headphones application 1008 may be accessed by higher layer application 1010, such as public announcement applications, social media applications, and emergency applications.

Figure 11:
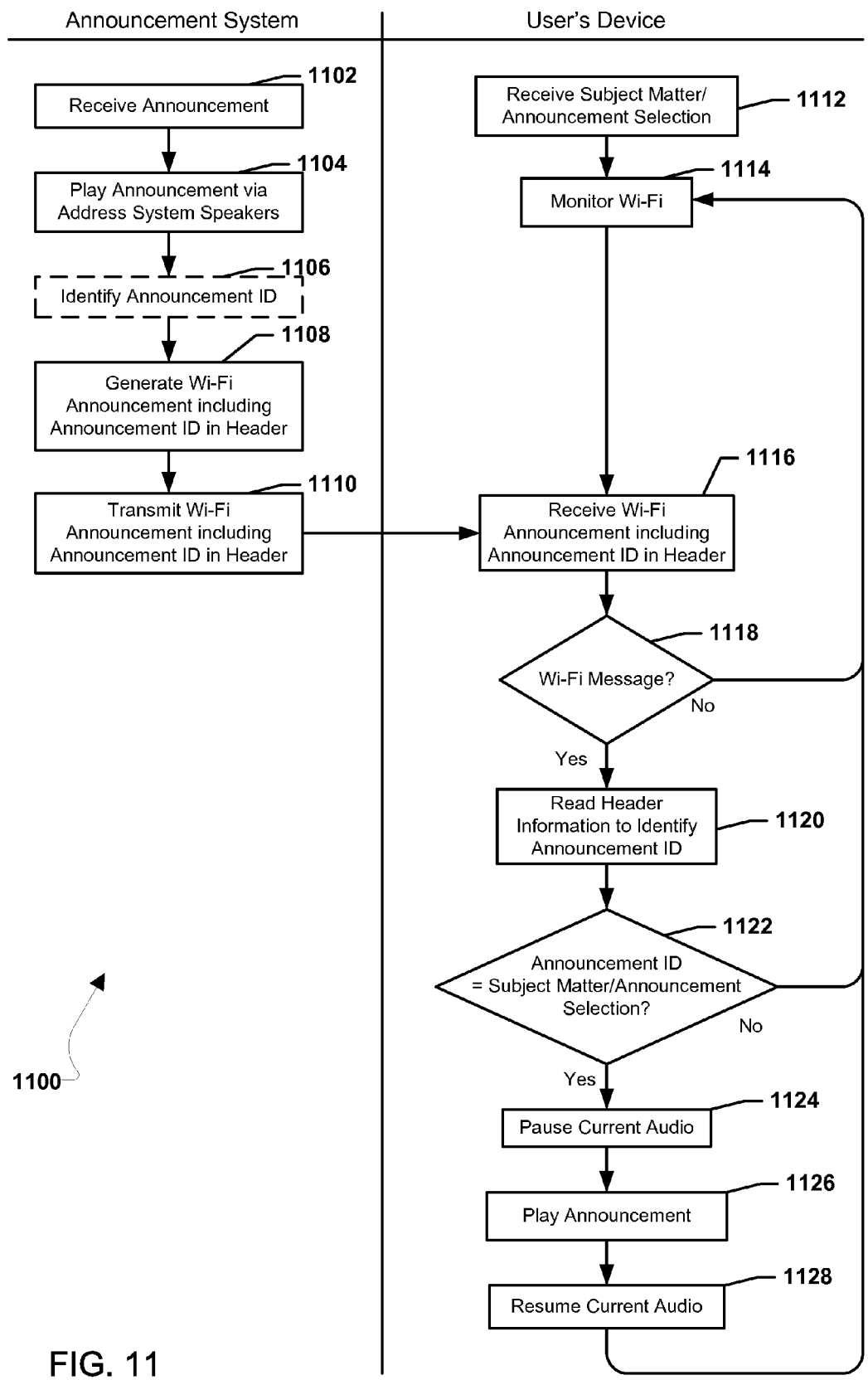
FIG. 11 is a process flow diagram illustrating an embodiment method for providing an announcement to a headphone user.

FIG. 11 illustrates an embodiment method 1100 for providing an announcement to a headphone user using a user device (e.g., a mobile device and/or headphones). In an embodiment, the operations of method 1100 may be performed by an announcement system in communication with a user device, such as headphones or a mobile device connected to headphones. In block 1102 the announcement system may receive an announcement. As an example, a gate agent at an airport may use a microphone at the gate counter to make boarding call announcement for a departing flight. In block 1104 the announcement system may play the announcement via the address system speakers. At optional block 1106 the announcement system may identify the announcement ID. In an embodiment, the announcement ID may be identified by voice to text recognition of subject matter within the received announcement. Identifying the announcement ID may not be necessary in all implementations, because the announcement ID may be unique to the location the announcement was made, for example unique to the microphone at the specific gate counter. In such implementations, all announcements from that gate counter may be given the same announcement ID. In block 1108 the announcement system may generate a Wi-Fi transmission (i.e., a message transmitted over a Wi-Fi wireless data link) including the announcement ID in the header of the Wi-Fi transmission. As an example, the Wi-Fi transmission may be a message comprised of multiple data packets including the received announcement, each including the announcement ID in the header. In block 1110 the announcement system may transmit the Wi-Fi transmission including the announcement ID in the header.

In block 1112 the user device may receive subject matter/announcement selections. As an example, subject matter/announcement selections may be indications of a user input to the device selecting subject matter and/or announcements that are of interest to the user. As an example, subject matter/announcement selections may include selected flight numbers or gates in an airport. In an embodiment, subject matter/announcement selections may be stored in a memory of the user device, for example as part of a user profile. In block 1114 the user device may monitor its Wi-Fi transceiver to determine whether any messages are received via a Wi-Fi connection.

In block 1116 the user's device may receive the Wi-Fi transmission including the announcement ID in the header. In determination block 1118 the user's device may determine whether the received Wi-Fi transmission is a Wi-Fi message. If the received Wi-Fi transmission is not a Wi-Fi message (i.e., determination block 1118="No"), in block 1114 the user device may continue to monitor the Wi-Fi transceiver. If the received Wi-Fi transmission is a Wi-Fi message (i.e., determination block 1118="Yes"), in block 1120 the user device may read the header information to identify the announcement ID. In determination block 1122 the user device may determine whether the announcement ID matches a subject matter and/or announcement selection received by the user device. For example, the user device may retrieve the user profile from memory including the subject matter and/or announcement selection and compare the announcement ID to the user profile. If the announcement ID does not match the subject matter and/or announcement selection (i.e., determination block 1122="No"), in block 1114 the user device may continue to monitor the Wi-Fi transceiver. If the announcement ID does match the subject matter and/or announcement selection (i.e., determination block 1122="Yes"), in block 1124 the user device may pause the current audio being output by the speakers of the headphones. In a further embodiment, the user device may also pause any current video output of the user device. In block 1126 the user device may play the announcement over the speakers of the headphones, in block 1128 the user device may resume the current audio/video which was being played before the announcement, and in block 1114 the user device may continue to monitor the Wi-Fi transceiver. In this manner, the user of the user device may be presented with the announcement, even though they were wearing headphones and may not have otherwise heard the announcement.

Figure 12:
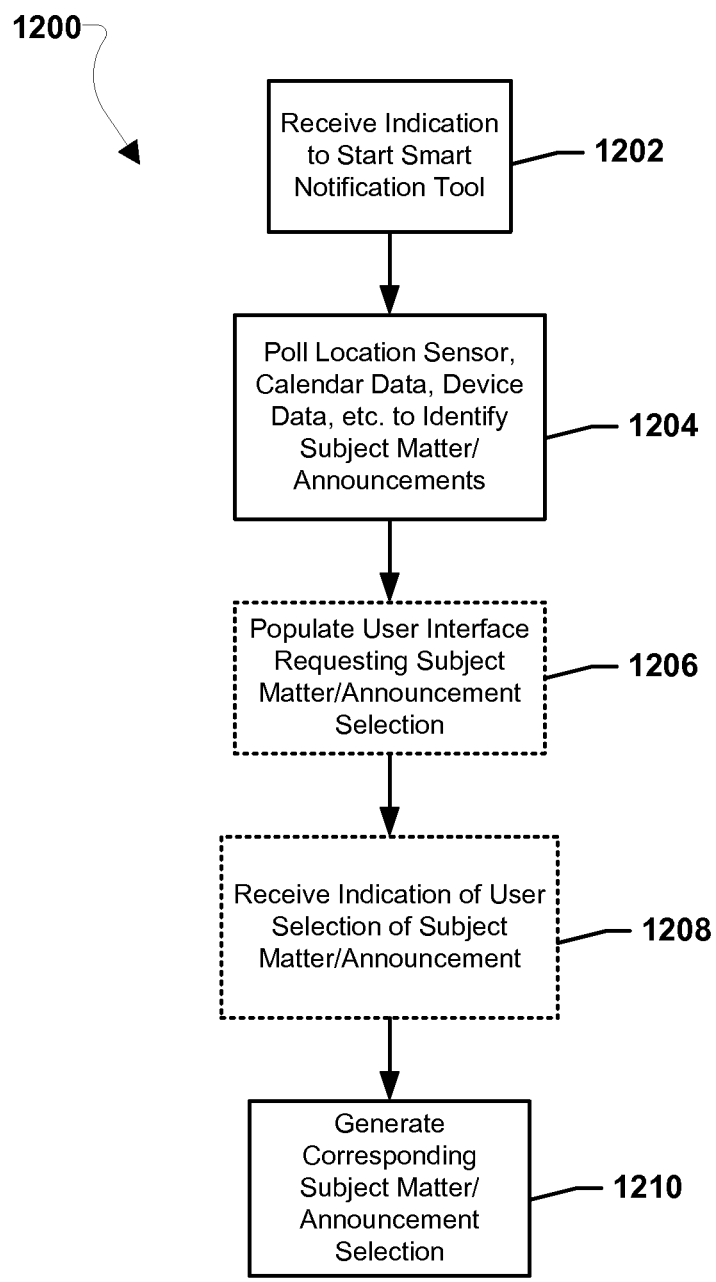
FIG. 12 is a process flow diagram illustrating an embodiment method for generating subject matter/announcement selections.

FIG. 12 illustrates an embodiment method 1200 for generating subject matter/announcement selections using a user device (e.g., a mobile device and/or headphones). In an embodiment, the operations of method 1200 may be performed by a processor of a user device, such as headphones or a mobile device connected to headphones. In block 1202 the user device processor may receive an indication to start a smart notification tool. In an embodiment, the notification to start the smart tool may be an indication that the headphones are in use. In another embodiment, the notification to start the smart tool may be an indication that the user has launched a notification application. In a further embodiment, the notification to start the smart tool may be an indication that the user device has entered a specific location, such as an airport. In block 1204 the user device processor may poll a location sensor, calendar data, device data, etc. to identify subject matter/announcements that may be of interest to the user of the mobile device. As an example, the user device processor may poll a GPS receiver to obtain coordinate information that may allow it to determine whether the user device is at an airport, and then when the device recognizes that it is within an airport, it may retrieve calendar entry data from a calendar application to identify a flight number for the user. In an optional embodiment, in block 1206 the user device processor may populate a user interface requesting subject matter and/or announcement selections, and in block 1208 the user device processor may receive an indication of the user selection of subject matter/announcements. In block 1210 the user device processor may generate corresponding subject matter/announcement selections. In an embodiment, the subject matter/announcement selections may be passed to a recognition engine to enable the user device to recognize relevant announcements.

Figure 13:
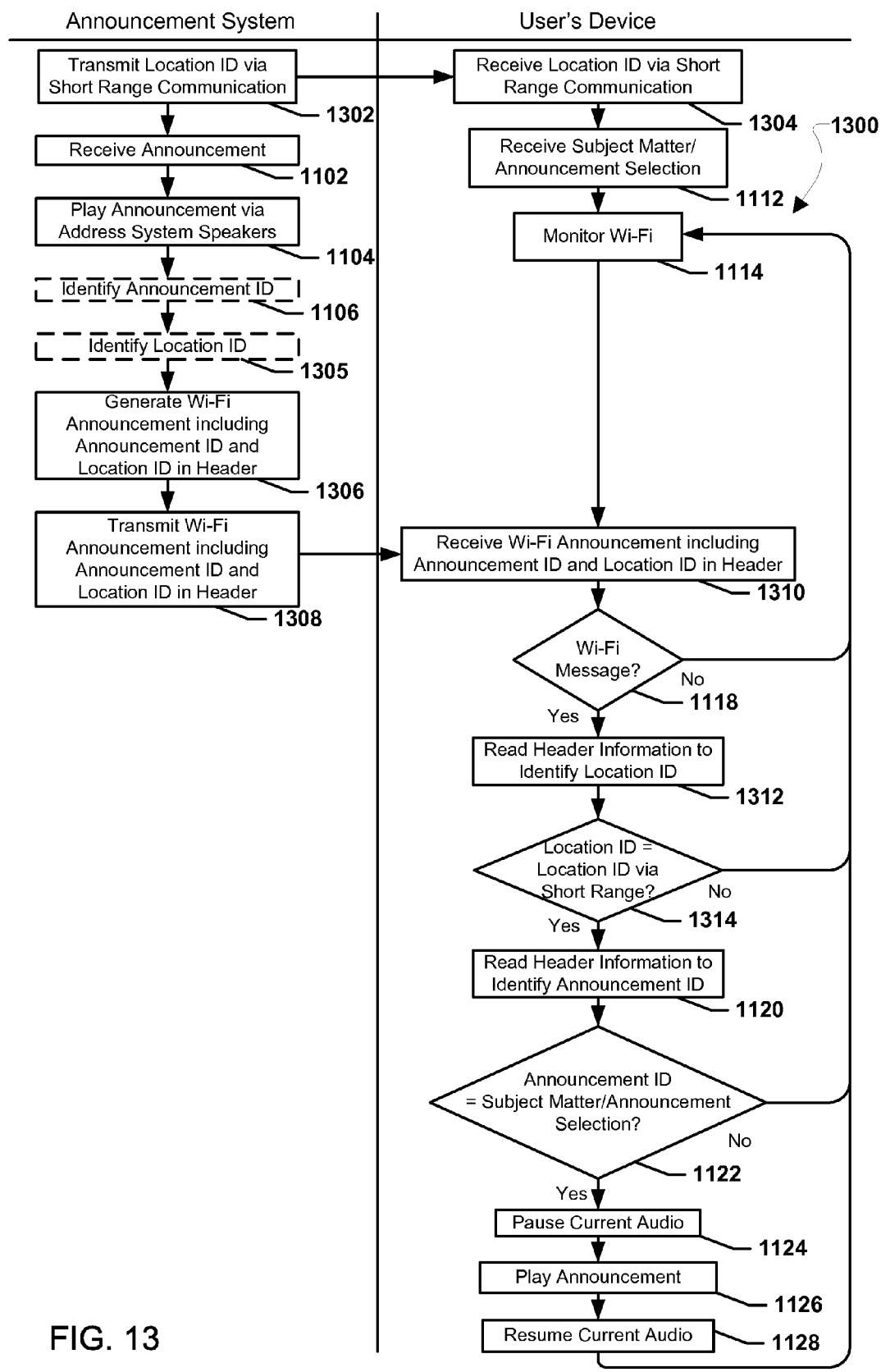
FIG. 13 is a process flow diagram illustrating a second embodiment method for providing an announcement to a headphone user.

FIG. 13 illustrates an embodiment method 1300 for providing an announcement using a user device (e.g., a mobile device and/or headphones) similar to method 1100 described above with reference to FIG. 11, except that in method 1300 a location ID may be included in the Wi-Fi transmission header. In block 1302 the announcement system may transmit a location ID via a short range communication, and in block 1304 the user device may receive the location ID via the short range communication. In an embodiment, a short range communication may be a limited range communication, such as a Bluetooth, NFC, RFID, ZIGBee, Peanut, etc. communication. In an embodiment, the location ID may be a unique identifier of the location and announcement relates to, such as a gate at an airport. As an example, the location ID may be the gate at an airport which may be transmitted by NFC communications from a short range transmitter located at the gate counter. In this manner, only user devices physically located near the gate counter may receive the location ID.

In blocks 1102, 1104, and 1106 the announcement system may perform operations of like numbered blocks of method 1100 described above with reference to FIG. 11. In optional block 1305 the announcement system may identify the location ID corresponding to the received announcement. As an example, the location ID may be identified by voice to text recognition of subject matter within the received announcement. Identifying the location ID may not be necessary because the location ID may be unique to the location the announcement was made, for example unique to the microphone at the specific gate counter. In block 1306 the announcement system may generate a Wi-Fi transmission including the announcement ID and location ID in the header of the Wi-Fi transmission message. In block 1308 the announcement system may transmit the Wi-Fi transmission message including the announcement ID and location ID in the header.

As discussed above, in blocks 1112 and 1114 the user device may receive the subject matter/announcement selection and monitor the Wi-Fi transceiver. In block 1310 the user device may receive the Wi-Fi transmission including the announcement ID and location ID in the header. As discussed above in determination block 1118 the user's device may determine whether the received Wi-Fi transmission is a Wi-Fi message. If the received Wi-Fi transmission is not a Wi-Fi message (i.e., determination block 1118="No"), in block 1114 the user device may continue to monitor the Wi-Fi transceiver. If the received Wi-Fi transmission is a Wi-Fi message (i.e., determination block 1118="Yes"), in block 1312 the user device may read the header information to identify the location ID. In determination block 1314 the user device may determine whether the location ID matches the location ID received via the short range communication. If the location IDs do not match (i.e., determination block 1314="No"), in block 1114 the user device may continue to monitor the Wi-Fi transceiver. If the location IDs do match (i.e., determination block 1314="Yes"), in blocks 1120, 1122, 1124, 1126, and 1128 the user device may perform operations of like numbered blocks of method 1100 described above with reference to FIG. 11 to determine whether the current audio/video should be paused to play the received announcement and if so, play the announcement.

Figure 14:
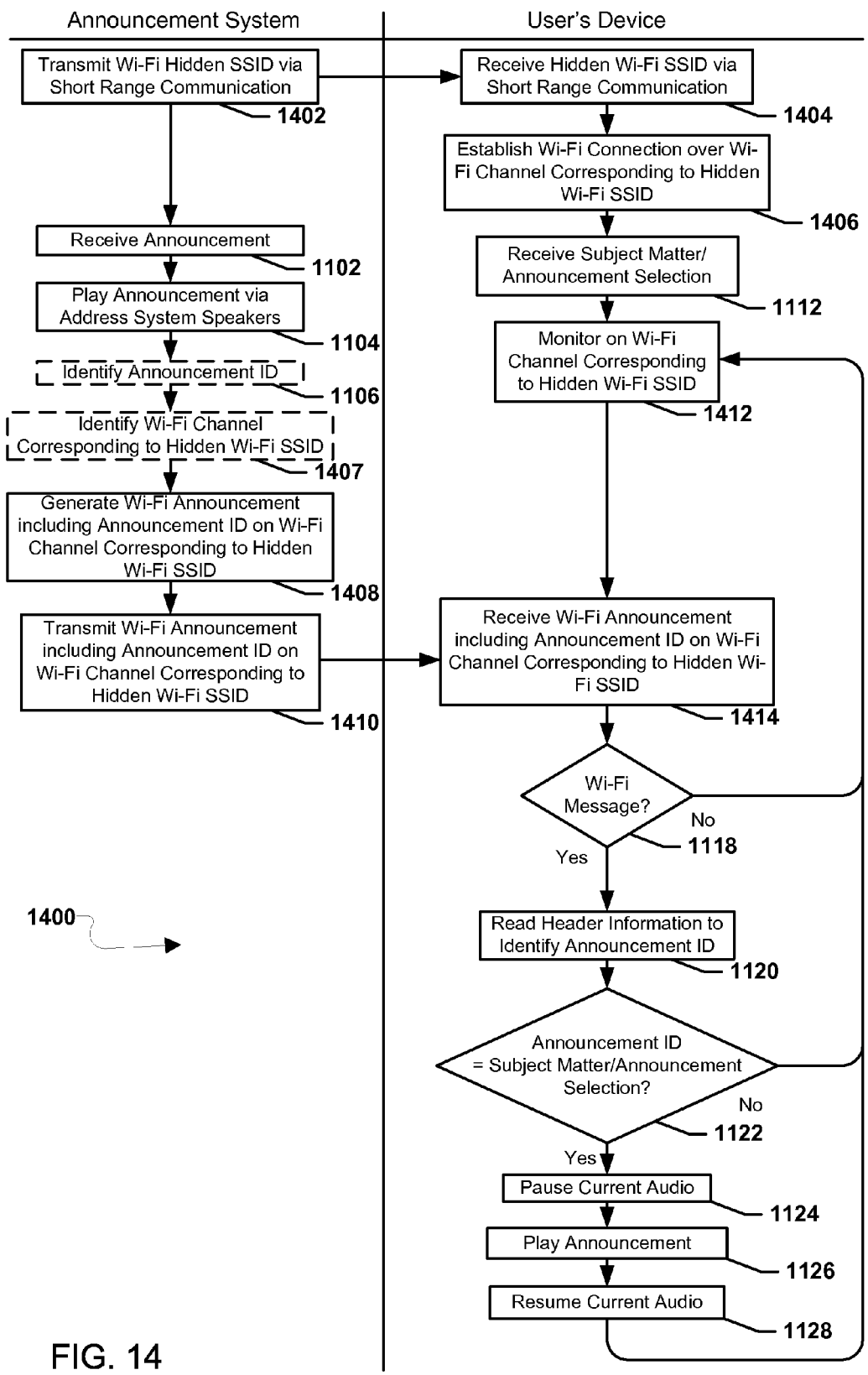
FIG. 14 is a process flow diagram illustrating a third embodiment method for providing an announcement to a headphone user.

FIG. 14 illustrates an embodiment method 1400 for providing an announcement using a user device (e.g., a mobile device and/or headphones) similar to method 1300 described above with reference to FIG. 13, except that in method 1400 a short range communication may be used to provide the user device with a hidden service set identification ("hidden SSID") for a specific Wi-Fi channel over which announcements for a specific location may be transmitted. In block 1402 the announcement system may transmit (e.g., via broadcast and/or multicast transmission) a Wi-Fi hidden SSID via a short range communication, and in block 1404 the user device may receive the hidden Wi-Fi SSID via short range communication. In an embodiment, a short range communication may be a limited range communication, such as a NFC, RFID, ZIGBee, Peanut, etc. communication. In an embodiment, the short range communication of the hidden SSID may prevent user devices not in close proximity to a specific location from receiving the hidden SSID and therefore receiving Wi-Fi transmissions over the Wi-Fi channel corresponding to the hidden SSID. In block 1406 the user device may establish the Wi-Fi connection over the Wi-Fi channel corresponding to the hidden Wi-Fi SSID using the hidden SSID received via the short range communication.

In blocks 1102, 1104, and 1106 the announcement system may perform operations of like numbered blocks of method 1100 described above with reference to FIG. 11. In optional block 1407 the announcement system may identify the Wi-Fi channel corresponding to the hidden Wi-Fi SSID. As an example, the Wi-Fi channel corresponding to the hidden Wi-Fi SSID may be identified by voice to text recognition of subject matter within the received announcement. The announcement system may compare subject matter in the received announcement to a data table correlating subject matter, hidden Wi-Fi SSIDs, and Wi-Fi channels, to select the corresponding Wi-Fi channel. Identifying the Wi-Fi channel corresponding to the hidden Wi-Fi SSID may not be necessary because the Wi-Fi SSID may be unique to the location the announcement was made, for example unique to the microphone at the specific gate counter. In block 1408 the announcement system may generate a Wi-Fi transmission including the announcement ID on the Wi-Fi channel corresponding to the hidden Wi-Fi SSID. In block 1410 the announcement system may transmit the Wi-Fi transmission message including the announcement ID on the Wi-Fi channel corresponding to the hidden Wi-Fi SSID.

As discussed above, in blocks 1112 the user device may receive the subject matter/announcement selection. In block 1412 the user device may monitor the Wi-Fi channel corresponding to the hidden Wi-Fi SSID. In block 1414 the user device may receive the Wi-Fi transmission including the announcement ID on the Wi-Fi channel corresponding to the hidden Wi-Fi SSID. As discussed above in determination block 1118 the user's device may determine whether the received Wi-Fi transmission is a Wi-Fi message. If the received Wi-Fi transmission is not a Wi-Fi message (i.e., determination block 1118="No"), in block 1412 the user device may continue to monitor the Wi-Fi channel corresponding to the hidden SSID. If the received Wi-Fi transmission is a Wi-Fi message (i.e., determination block 1118="Yes"), in blocks 1120, 1122, 1124, 1126, and 1128 the user device may perform operations of like numbered blocks of method 1100 described above with reference to FIG. 11 to determine whether the current audio/video should be paused to play the received announcement and if so, play the announcement.

Figure 15A:
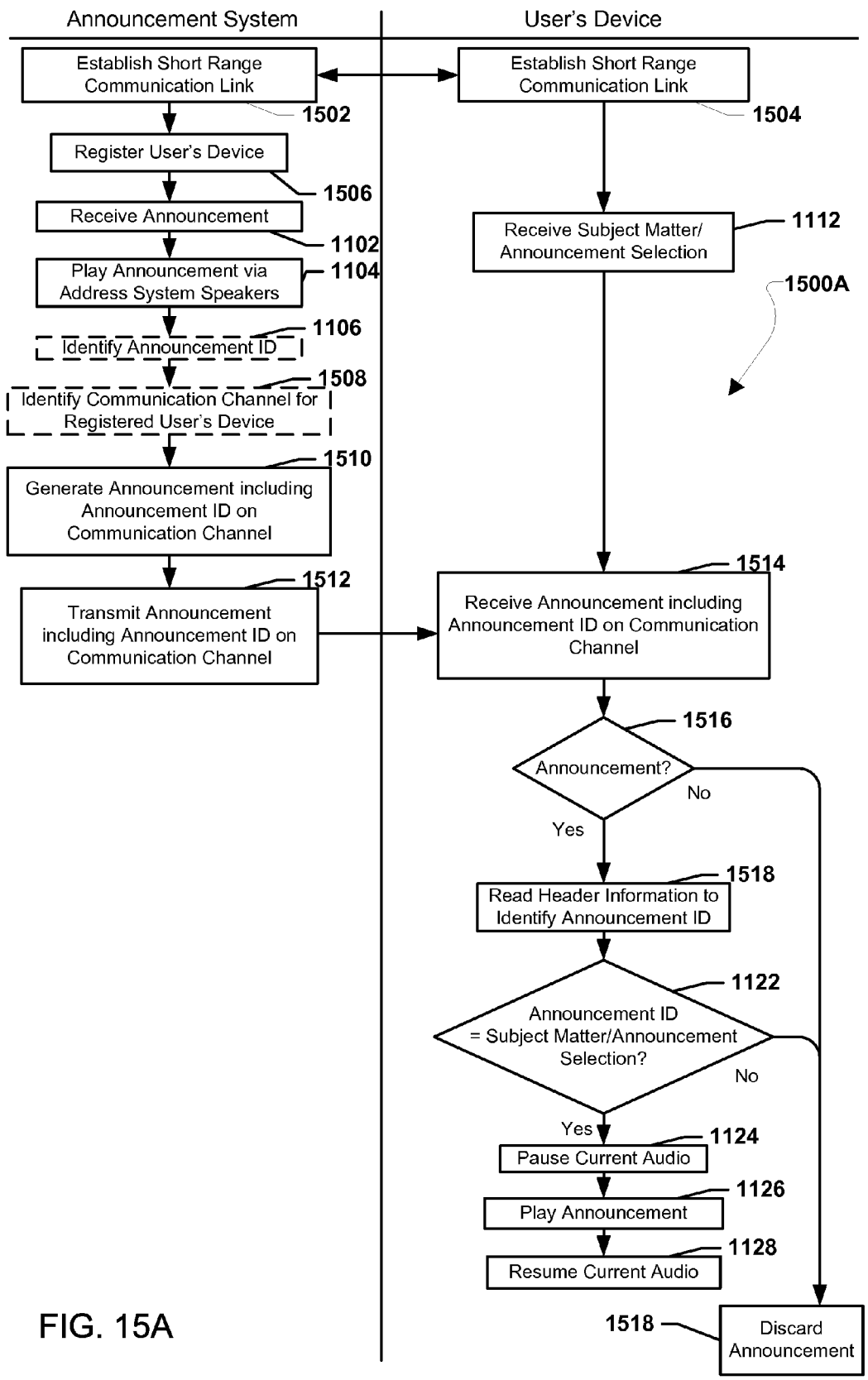
FIG. 15A is a process flow diagram illustrating a fourth embodiment method for providing an announcement to a headphone user.

FIG. 15A illustrates an embodiment method 1500A for providing an announcement using a user device (e.g., a mobile device and/or headphones) similar to method 1100 described above with reference to FIG. 11, except that in method 1500A the user device may receive a pushed announcement via a communication channel that may not be a Wi-Fi communication channel, such as a cellular communication channel. In blocks 1502 and 1504 the announcement system and the user device may establish a short range communication link with each other. In an embodiment, a short range communication link may be a limited range communication link, such as a Bluetooth, NFC, RFID, ZIGBee, Peanut, etc. link and as part of establishing the short range communication link the user device may provide registration information to the announcement system, such as a user ID, preferred communication channel, telephone number, etc. In this manner, the user device may be required to be physically near a specific location in order to be registered to receive announcements. In block 1506 the announcement system may register the user's device. In an embodiment, the user's device may be registered to receive announcements via a specific communication channel, for example a cellular telephone call, from the announcement system. In an embodiment, the announcement system may send an indication to the user device that the user device has been successfully registered with the announcement system.

In blocks 1102, 1104, and 1106 the announcement system may perform operations of like numbered blocks of method 1100 described above with reference to FIG. 11. In optional block 1508 the announcement system may identify the communication channel for the registered user's device, for example by identifying the preferred communication channel for a registered user from a data table. In block 1510 the announcement system may generate the announcement including the announcement ID on the communication channel. In block 1512 the announcement system may transmit the announcement including the announcement ID on the communication channel. In an embodiment, the transmitting of the announcement on the communication channel may include connecting to an outside server that may push transmission automatically to the user device and having the outside server transmit the announcement to the user's device, such as via a cellular data transmission.

As discussed above, in block 1112 the user device may receive the subject matter/announcement selection. In block 1514 the user device may receive the announcement ID on the communication channel. In determination block 1516 the user device may determine whether the received data is a valid announcement. If the data is not a valid announcement (i.e., determination block 1516="No"), in block 1518 the user device may discard the data/announcement. If the data is a valid announcement (i.e., determination block 1516="Yes"), in block 1518 the user device may read the header information in the announcement message to identify the announcement ID. In blocks 1120, 1122, 1124, 1126, and 1128 the user device may perform operations of like numbered blocks of method 1100 described above with reference to FIG. 11 to determine whether the current audio/video should be paused to play the received announcement and if so, play the announcement.

Figure 15B:
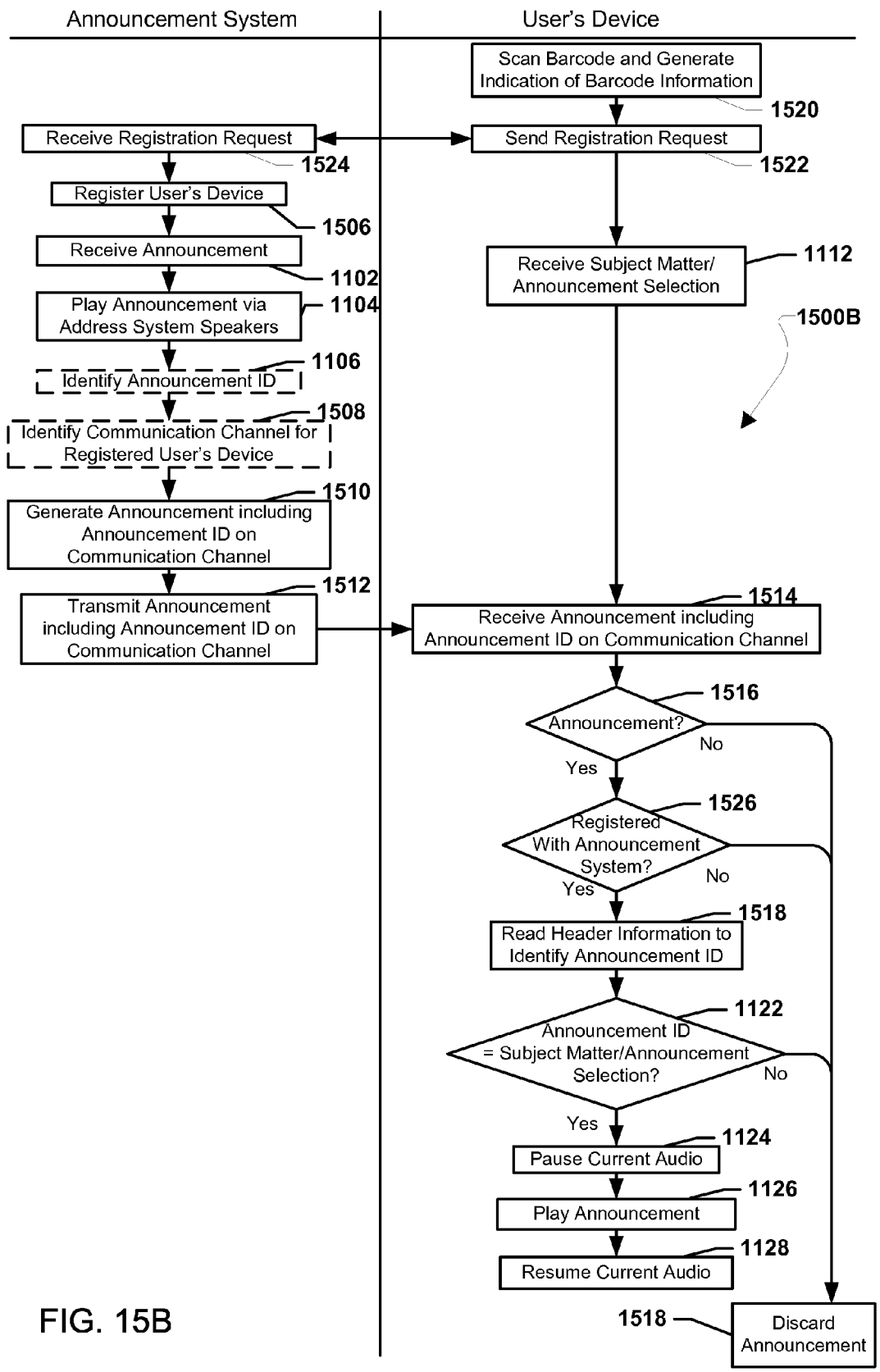
FIG. 15B is a process flow diagram illustrating a fifth embodiment method for providing an announcement to a headphone user.

FIG. 15B illustrates an embodiment method 1500B for providing an announcement using a user device (e.g., a mobile device and/or headphones) similar to method 1500A described above with reference to FIG. 15A, except that in method 1500B the user device may scan a barcode with a barcode scanner to obtain the information encoded in the barcode and use that information to register with the announcement system in order to receive announcements. In block 1520 the user device may scan a barcode with a barcode scanner to generate an indication of barcode information encoded within the barcode. As an example, the barcode may be a QR code posted in a boarding area or passenger lounge that encodes information indicating an electronic address (e.g., URL) to which the user device can send a registration request. The encoded information may also include an area ID assigned to the location in which the QR code is posted, or the encoded address may be specific to the location. In block 1522, the user device may send a registration request to the announcement system and, the announcement system may receive the registration request in block 1524. In an embodiment, the registration request may be based on the indication of barcode information generated from scanning the barcode. As an example, a registration request may be sent to a URL encoded in a QR code scanned by the user device, and the registration request may include the area ID of the location at which the QR code was posted that was also encoded in the QR code.

In blocks 1506, 1102, 1104, 1106, 1508, 1510, and 1512 the announcement system may perform operations of like numbered blocks of method 1500A described above with reference to FIG. 15A to transmit an announcement to the user device. In blocks 1514 and 1516 the user device may perform operations of like numbered blocks of method 1500A described above with reference to FIG. 15A to determine whether the received data is a valid announcement. If the data is a valid announcement (i.e., determination block 1516="Yes"), the user device may determine whether the user device is registered with the announcement system in determination block 1526. As an example, the user device may determine whether a registration request was previously sent to the announcement system to determine whether the user device is registered with the announcement system. If the user device is not registered (i.e., determination block 1526="No"), the user device may discard the data/announcement in block 1518. If the user device is registered (i.e., determination block 1526="Yes"), in blocks 1518, 1122, 1124, 1126, and 1128 the user device may perform operations described above with reference to FIG. 15 for like numbered blocks of method 1500A to determine whether the current audio/video should be paused to play the received announcement and, if so, play the announcement.

Figure 16:
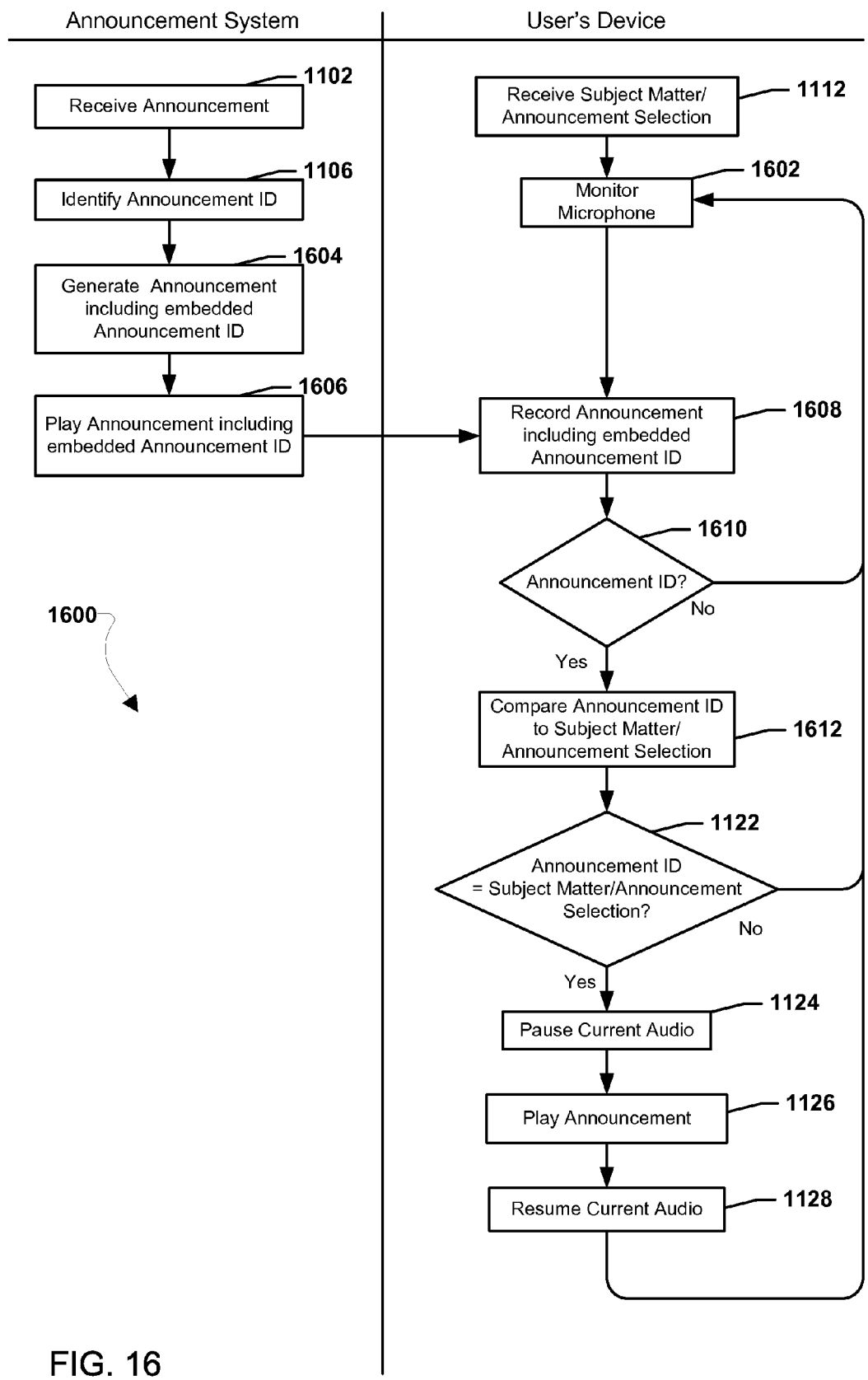
FIG. 16 is a process flow diagram illustrating a sixth embodiment method for providing an announcement to a headphone user.

FIG. 16 illustrates an embodiment method 1600 for providing an announcement using a user device (e.g., a mobile device and/or headphones) similar to method 1100 described above with reference to FIG. 11, except that in method 1600 an announcement identifier may be acoustically embedded in the announcement played over the speakers of the announcement system to identify the announcement being played. As discussed above in blocks 1102 and 1106 the announcement system may receive an announcement and identify an announcement ID. As discussed above in block 1112 the user device may receive the subject matter/announcement selection.

In block 1604 the announcement system may generate the announcement including the embedded announcement ID. In an embodiment, the embedded announcement ID may be an encoded indication of the announcement ID, such as a high frequency code, high pitch tones or group of tones, etc. that may be embedded in the announcement to identify information about the announcement, such as announcement ID, location ID, subject matter, etc. In an embodiment, the announcement ID may be embedded throughout the announcement. In another embodiment, the announcement ID may be appended to the beginning of the announcement. In an embodiment, the embedded announcement ID may not be intended to be audible by unaided human hearing. In block 1606 the announcement system may play the announcement including the embedded announcement ID over the speakers of the announcement system. As an example, a gate agent's announcement over the public address system in an airport may be played including the embedded announcement ID.

In block 1602 the user device may monitor a microphone of the user device. In an embodiment, the microphone may be continually recording received sound on the user device. In block 1608 the user device may record the announcement including the embedded announcement ID. In determination block 1610 the user device may determine whether the recorded announcement includes an embedded announcement ID. As an example, the user device may monitor a specific high frequency range to identify an encoded audio signal corresponding to an announcement ID format. If no announcement ID is present (i.e., determination block 1610="No"), in block 1602 the user device may continue to monitor the microphone. If an announcement ID is present (i.e., determination block 1610="Yes"), in block 1612 the user device may compare the announcement ID to the subject matter/announcement selection. In blocks 1122, 1124, 1126, and 1128 the user device may perform operations of like numbered blocks of method 1100 described above with reference to FIG. 11 to determine whether the current audio/video should be paused to play the recorded announcement and if so, play the recorded announcement.

Figure 17:
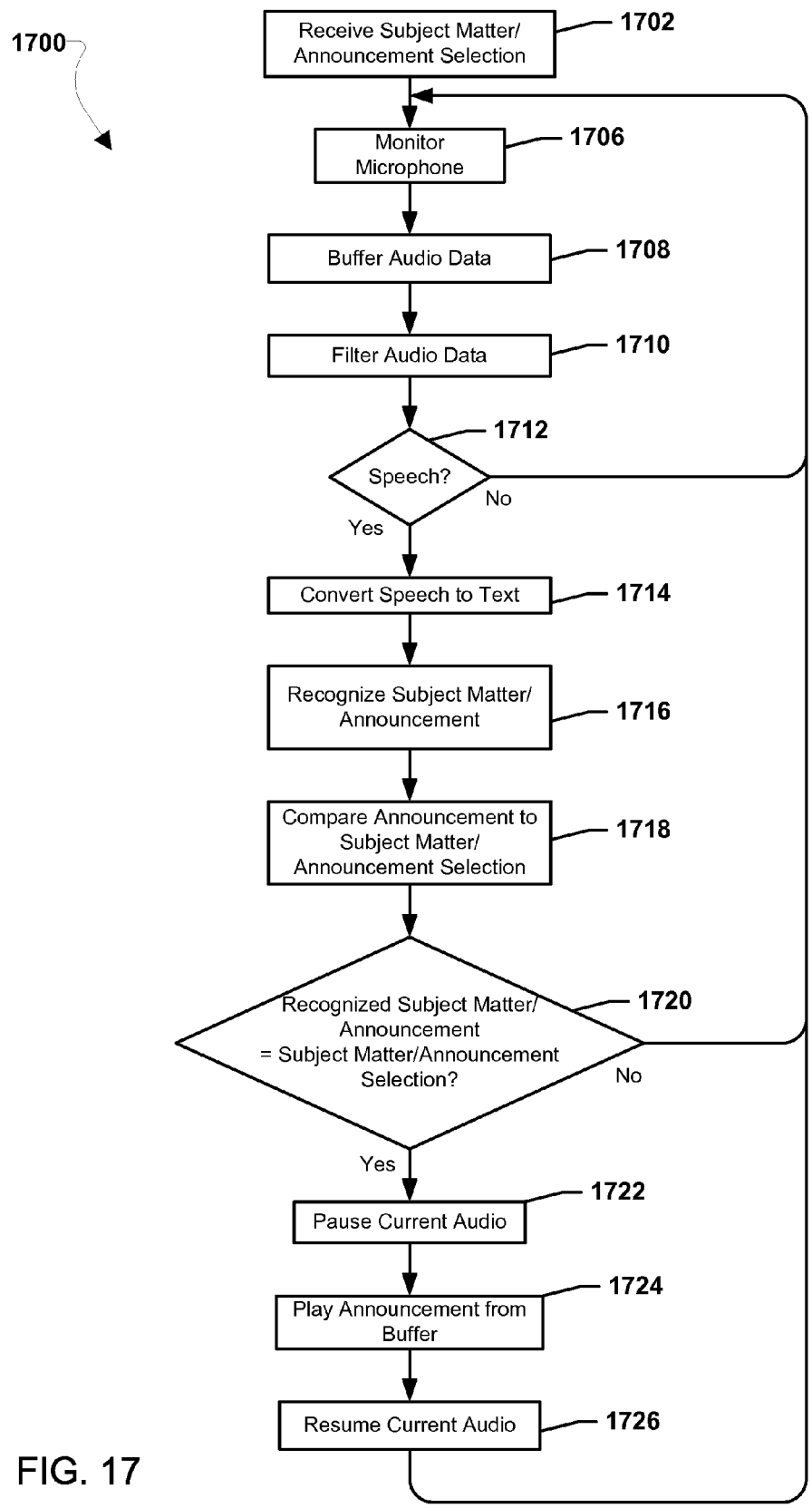
FIG. 17 is a process flow diagram illustrating a seventh embodiment method for providing an announcement to a headphone user.

FIG. 17 illustrates an embodiment method 1700 for recognizing announcements using a user device (e.g., a mobile device and/or headphones). In an embodiment, the operations of method 1700 may be performed by the processor of a user device, such as headphones or a mobile device connected to headphones. In an embodiment, method 1700 may enable a user device processor to identify announcements without any specific action taken on the part of the announcer or announcing system to directly indicate to the user device that an announcement was made. In block 1702 the user device may receive subject matter/announcement selections. As an example, subject matter/announcement selections may be indications of a user input to the user device selecting subject matter and/or announcements which are of interest to the user. As an example, subject matter/announcement selections may include selected flight numbers or gates in an airport.

In block 1706 the user device may monitor its microphone to record sound received by the microphone. In block 1708 the user device processor may buffer audio data received from the microphone. In an embodiment, the user device processor may store a limited time period of audio data, for example 1 minute of audio data in a memory of the user device. In block 1710 the user device processor may filter the audio data. At as example, the user device processor may apply filters to the audio data to separate background noise from speech. In determination block 1712 the user device may determine whether speech is present in the audio data. If speech is not present in the audio data (i.e., determination block 1712="No"), in blocks 1706, 1708, and 1710 the user device may continue to monitor the microphone, buffer audio data, and filter audio data.

If speech is present (i.e., determination block 1712="Yes"), in block 1714 the user device processor may convert the speech to text. In block 1716 the user device processor may recognize subject matter/announcements in the text. For example, the user device processor may identify specific words stored in a memory of the user device, for example stored in a user profile in a memory, as subject matter and/or announcement indicators and/or apply natural language processing to identify words or phrases that are similar to stored subject matter and/or announcement indicators.

In block 1718 the user device processor may compare any recognized subject matter/announcements in the text to the received subject matter/announcement selections, and in determination block 1720 the user device processor may determine whether the recognized subject matter/announcement matches a subject matter/announcement selection. In this manner, though multiple announcements may be identified by the user device processor, only those corresponding to subject matter/announcements of interest to the user may be selected for output on the user device. If the recognized subject matter/announcements do not match the subject matter/announcement selections (i.e., determination block 1720="No"), in block 1706 the user device may continue to monitor the microphone.

If the recognized subject matter/announcements match the subject matter/announcement selections (i.e., determination block 1720="Yes"), in block 1722 the user device processor may pause the current audio output over the headphone speakers. In a further embodiment, the user device processor may also pause any current video output of the user device. In block 1724 the user device processor may retrieve the audio data from the buffer corresponding to the announcement and play the announcement from the buffer over the speakers of the headphones. In block 1726 the user device processor may resume the current audio/video output, and in block 1706 continue to monitor the microphone.

Figure 18:
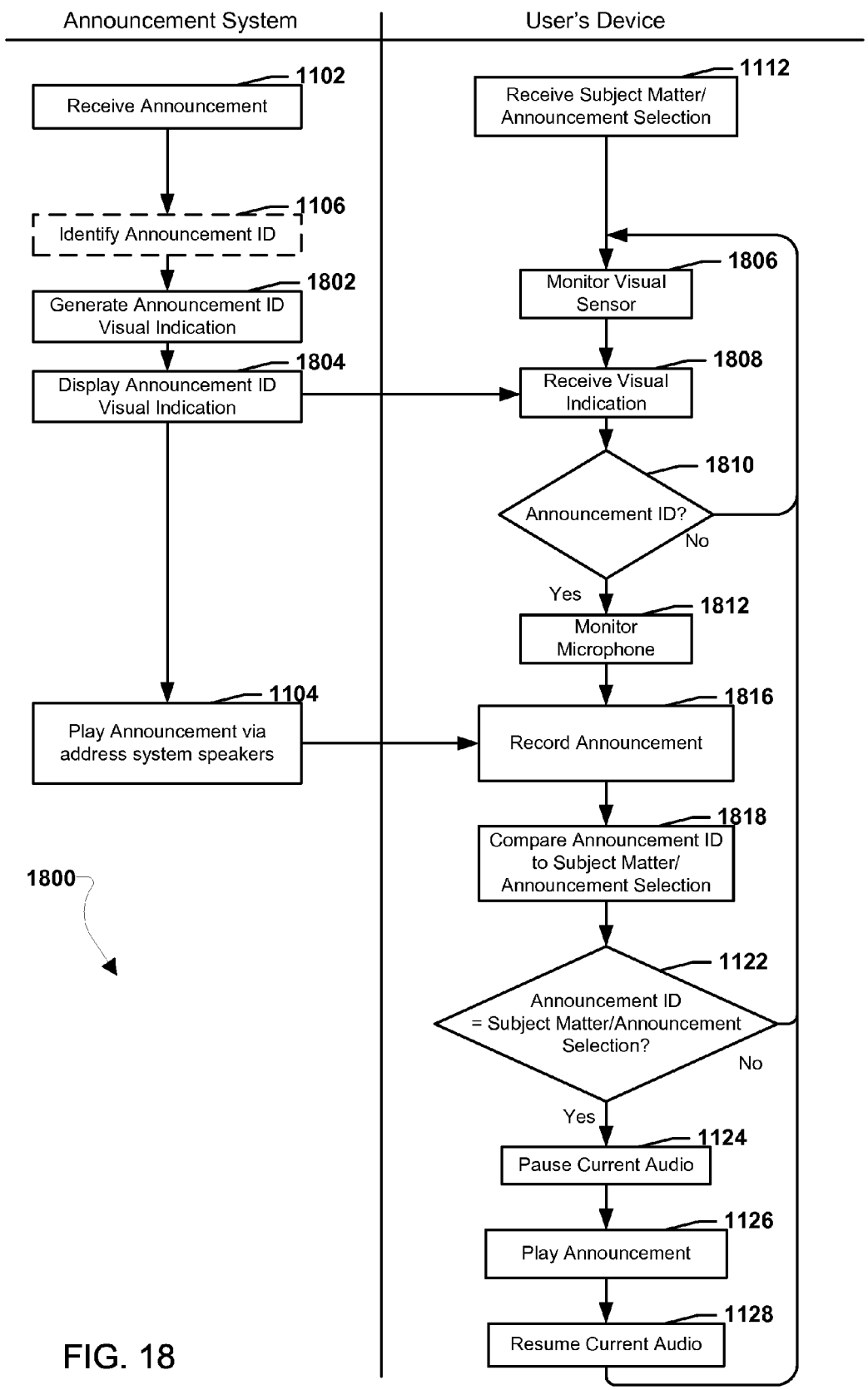
FIG. 18 is a process flow diagram illustrating an eighth embodiment method for providing an announcement to a headphone user.

FIG. 18 illustrates an embodiment method 1800 for providing an announcement using a user device (e.g., a mobile device and/or headphones) similar to method 1100 described above with reference to FIG. 11, except that in method 1800 an announcement may be signaled visual to the user device. As discussed above in blocks 1102 and 1106 the announcement system may receive an announcement and identify an announcement ID. As discussed above in block 1112 the user device may receive the subject matter/announcement selection.

In block 1802 the announcement system may generate announcement ID light signals. In an embodiment, an announcement ID light signal may be light signals that an announcement is going to be made or is being made, such as a flashing light, encoded display, etc. In an embodiment, the light signals for each announcement ID may be unique. In block 1804 the announcement system may display the announcement ID light signals, such as by flashing a light, or outputting an encoded message on a display.

In block 1806 the user device may monitor a light sensor, such as a photosensor or camera connected to the user device. In block 1808 the user device may receive the light signals, and in block 1810 may determine whether the light signals include an announcement ID. If the light signals do not include an announcement ID (i.e., determination block 1810="No"), in block 1806 the user device may continue to monitor the visual sensor. If the light signals do include an announcement ID (i.e., determination block 1810="Yes"), in block 1812 the user device may monitor the microphone.

As discussed above, in block 1104 the announcement system may play the announcement. In block 1816 the user device may record the announcement, for example by recording the announcement with the microphone. In block 1818 the user device may compare the announcement ID to the subject matter/announcement selection. In blocks 1122, 1124, 1126, and 1128 the user device may perform operations of like numbered blocks of method 1100 described above with reference to FIG. 11 to determine whether the current audio/video should be paused to play the recorded announcement and if so, play the recorded announcement.

Figure 19:
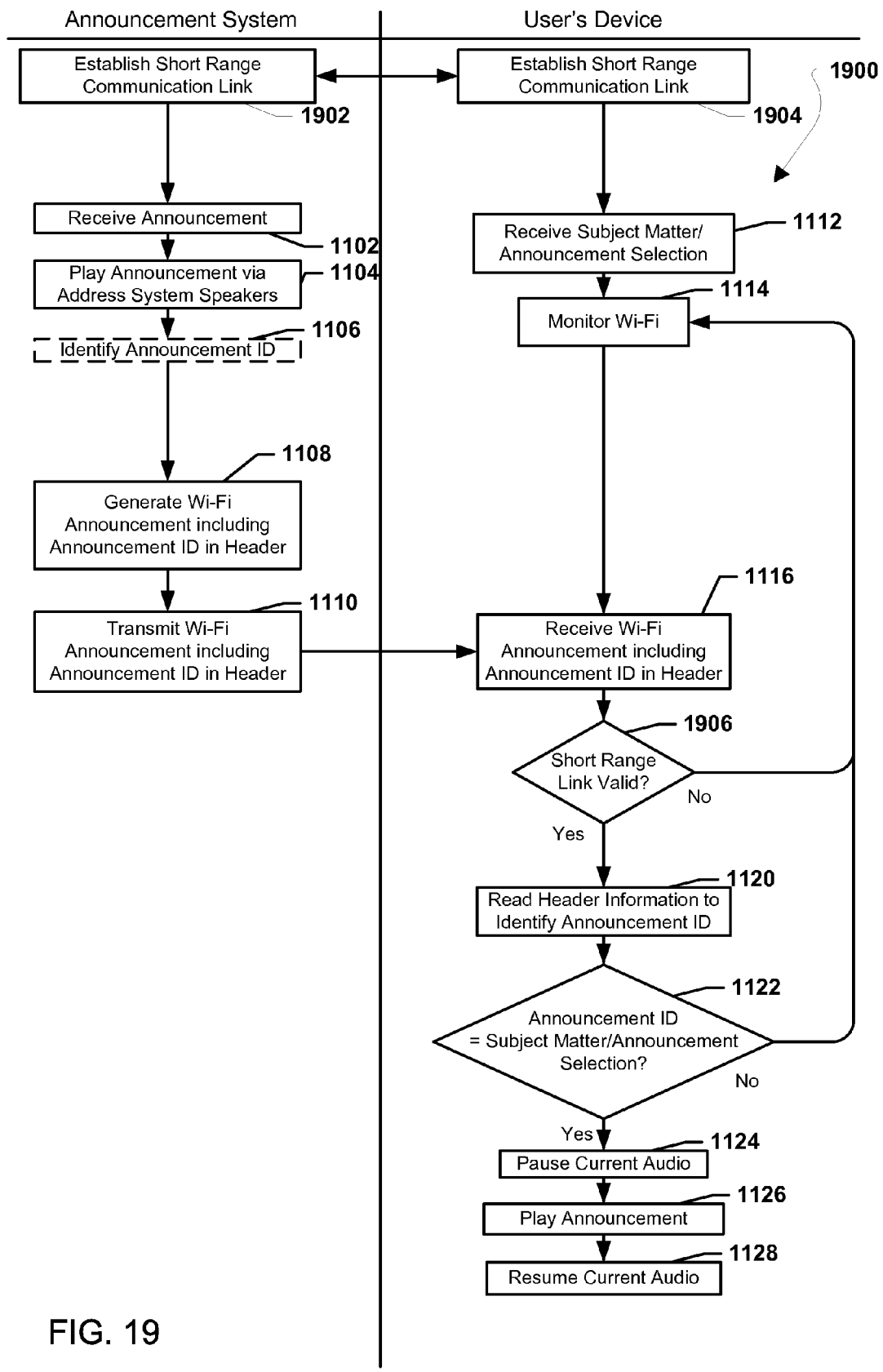
FIG. 19 is a process flow diagram illustrating a ninth embodiment method for providing an announcement to a headphone user.

FIG. 19 illustrates an embodiment method 1900 for providing an announcement using a user device (e.g., a mobile device and/or headphones) similar to method 1100 described above with reference to FIG. 11, except that in method 1900 the user device may establish and maintain a short range communication link in order to output announcements. In blocks 1902 and 1904 the announcement system and the user device may establish a short range communication link with each other. In an embodiment, a short range communication link may be a limited range communication link, such as a Bluetooth, NFC, RFID, ZIGBee, Peanut, etc. link. In blocks 1102, 1104, 1106, 1108, and 1110 the announcement system may perform operations of like numbered blocks of method 1100 described above with reference to FIG. 11 may be performed to transmit the Wi-Fi transmission. In blocks 1112, 1114, and 1116 the user device may perform operation of like numbered blocks of method 1100 described above with reference to FIG. 11 to receive the Wi-Fi transmission.

In determination block 1906 the user device may determine whether the short range link with the announcement system is still established and valid. In this manner, the user device may be enabled to determine whether the user device is still in close proximity to a specific location. If the short range link is not still valid (i.e., determination block 1906="No"), in block 1114 the user device may monitor the Wi-Fi transceiver. If the short range link is still established (i.e., determination block 1906="Yes"), in blocks 1120, 1122, 1124, 1126, and 1128 the user device may perform operations of like numbered blocks of method 1100 described above with reference to FIG. 11 to determine whether the current audio/video should be paused to play the recorded announcement and if so, play the recorded announcement.

Figure 20:
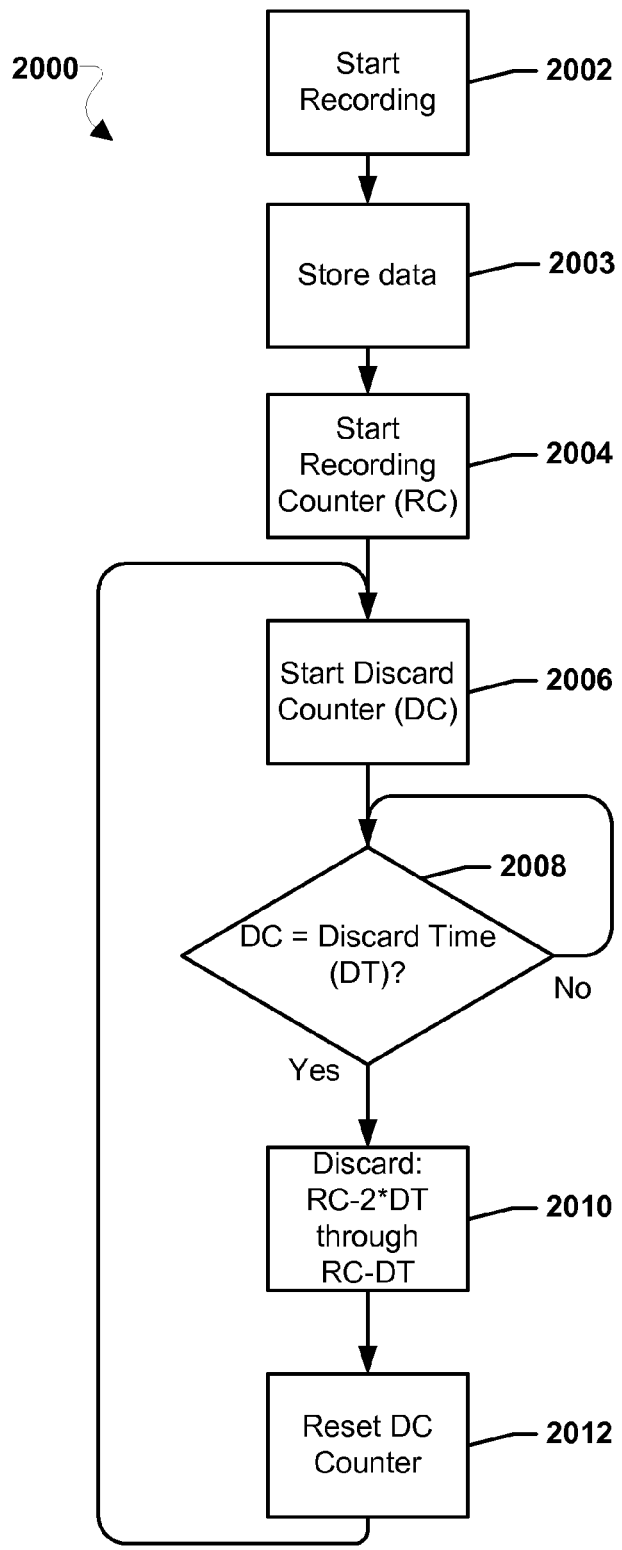
FIG. 20 is a process flow diagram illustrating an embodiment method for audio data recording.

FIG. 20 illustrates an embodiment method 2000 for audio data recording. In an embodiment, the operations of method 2000 may be implemented by the processor of a user device. In another embodiment, the operations of method 2000 may be performed by processors of announcement systems. In block 2002, the processor may start recording audio data. As an example, a sound sensor, such as a microphone, may start recording in response to the actuation of an announcement. In block 2003, the processor may store the raw audio data stream in a memory. As an example, the processor may store the raw audio data output by the microphone in a buffer. In block 2004, the processor may start a recording counter or clock ("RC"). In an embodiment, the recording counter/clock may be a count-up counter/clock incremented based on an internal clock of the processor. In this manner, the recording counter or clock may count/measure the time since the start of recording. In block 2006, the processor may start a discard counter or clock ("DC"). In an embodiment, the discard counter/clock may be a count-up counter/clock incremented based on an internal clock of the processor.

In determination block 2008, the processor may compare the value of the discard counter/clock to a discard time ("DT") value. In an embodiment, the discard time may be equal to a period of time for which the processor may be required to maintain previously recorded sensor outputs. As an example, in embodiments in which the processor maintains the last one minute of recorded sensor outputs in a buffer, the discard time may be equal to 60 seconds. In an embodiment, the discard time may be a value stored in the memory. If the discard counter/clock does not equal the discard time (i.e., determination block 2008="No"), the method 2000 may return to determination block 2008 and continue to compare the value of the discard counter/clock to the discard time. If the discard counter/clock does equal the discard time (i.e., determination block 2008="Yes"), in block 2010 the processor may discard from memory portions of the sensor output corresponding to RC-(2DT) through RC-DT. In this manner, memory overflow issues may be avoided because portions of the sensor output aged beyond the discard time may be discarded from memory. As an example, in an embodiment in which the discard time equals 60 seconds, every 60 second portion of the sensor output (e.g., raw data stream segments, such as raw audio data from a microphone and/or audio input codec) recorded more than 60 seconds earlier may be discarded. In block 2012 the processor may reset the discard counter/clock to zero, and in block 2006 the processor may restart the discard counter. In this manner, a limited memory buffer of sensor outputs may be maintained while not overburdening the memory with storing all recorded sensor outputs.

Figure 21:
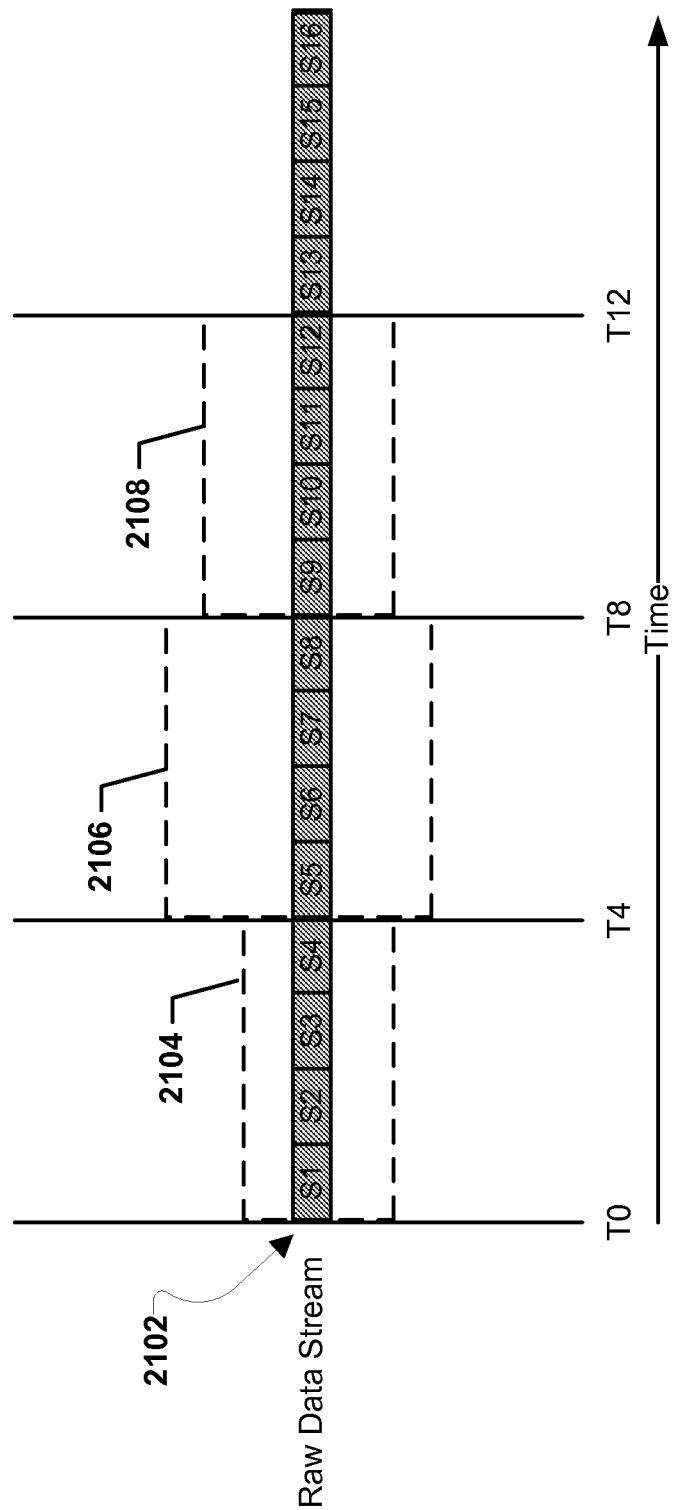
FIG. 21 illustrates an example recorded data stream.

FIG. 21 illustrates an example recorded sensor output, raw data stream 2102, generated according to the operations of method 2000 discussed above with reference to FIG. 20. Recording of the sensor output may be started at time T0 to begin to generate raw data stream 2102. At time T0 the recording counter/clock and the discard counter/clock may also be started. As time progresses, the sensor output may be recorded in segments of equal lengths of time, such as S1, S2, S3, S4, S5, S6, S7, S8, S9, S10, S11, S12, S13, S14, S15, and S16. As an example, the segments S1-S16 may be a plurality of audio packets. In an embodiment in which the discard time is equal to T4, at time T4 the record counter/clock may equal T4 and the discard counter/clock may equal T4. The discard counter/clock may then be equal to the discard time, and any segments of the raw data stream 2102 older than T0 may be discarded and the discard counter/clock may be reset to zero. In this manner, a buffer 2104 equal to the discard time may be maintained in memory. At time T8 the record counter/clock may equal T8 and the discard counter/clock may equal T4. The discard counter/clock may then be equal to the discard time, and any segments of the raw data stream 2102 older than T4 may be discarded and the DC may be reset to zero. In this manner, a buffer 2106 equal to the discard time may be maintained in memory and the previous buffer 2104 may be discarded. At time T12 the record counter/clock may equal T12 and the discard counter/clock may equal T4. The discard counter/clock may then be equal to the discard time, and any segments of the raw data stream 2102 older than T4 may be discarded and the discard counter/clock may be reset to zero. In this manner, a buffer 2108 equal to discard time may be maintained in memory and the previous buffer 2106 may be discarded. In another embodiment, the processor may be configured with a buffer configured to store a moving window of a finite number of captured audio packets that deletes the oldest audio packets as each new packet is stored once the buffer is full.

Figure 22:
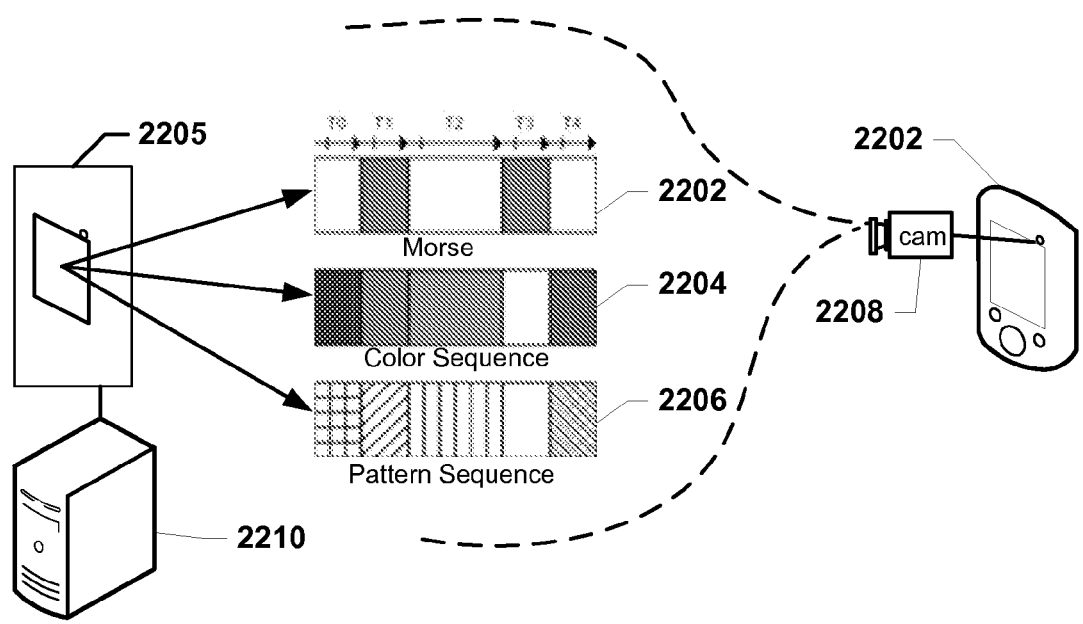
FIG. 22 illustrates an example visual recording system.

FIG. 22 is a diagram illustrating a user device 2202 receiving light signals with a camera 2208 from a display 2205 of an announcement system 2210. When within a certain proximity, the user device 2202 may detect light and/or sound signals emitted by a nearby signaling device 2205. The user device 2202 may include a camera 2208 configured to capture, buffer and/or store imagery and other light information. For example, the camera 2208 may receive imagery of a display 2205. In an embodiment, the camera 2205 may be configured to detect light signals (e.g., imagery or modulated light) using low-light or infrared photoreceptors. In various embodiments, the camera 2208 may record still images or imagery in motion, and may output data as still photographic images, video files, or streaming video data utilizing various encodings and formats.

The display 2205 may emit light signals that may be detected by the camera 2208 or another type of photosensor. The light signals emitted by the display 2205 may include modulating, flashing, and/or changing sequences of light 2202 (e.g., visible Morse code), sequences of colors 2204 (e.g., blue, red, yellow, etc.), and/or sequences of patterns 2206 (e.g., cross-thatched lines, horizontal lines, vertical lines, angled lines, etc.). The user device 2202 may detect the emitted light and/or sound signals when the display unit of the display 2205 is within sight, detectable, or otherwise viewable by the user device 2202.

Figure 23:
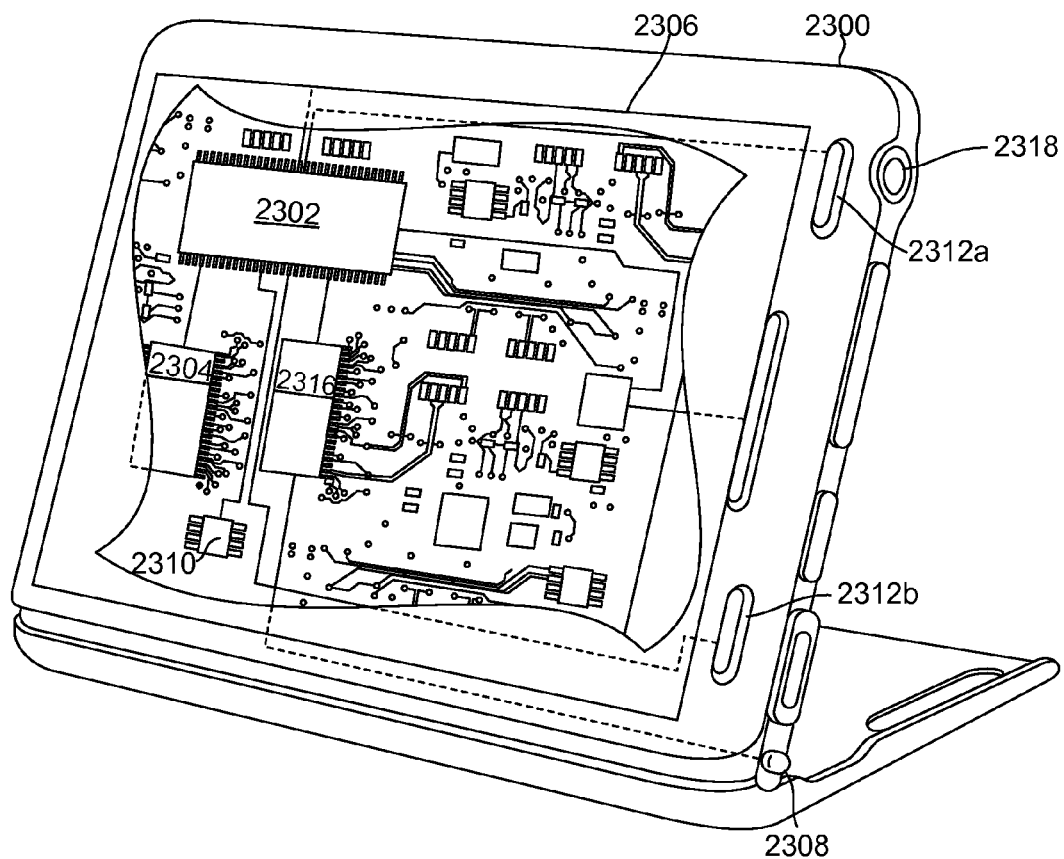
FIG. 23 is a component diagram of an example mobile device suitable for use with the various embodiments.

The various embodiments may be implemented in any of a variety of mobile devices, an example of which is illustrated in FIG. 23. For example, the mobile device 2300 may include a processor 2302 coupled to internal memories 2304 and 2310. Internal memories 2304 and 2310 may be volatile or non-volatile memories, and may also be secure and/or encrypted memories, or unsecure and/or unencrypted memories, or any combination thereof. The processor 2302 may also be coupled to a touch screen display 2306, such as a resistive-sensing touch screen, capacitive-sensing touch screen infrared sensing touch screen, or the like. Additionally, the display of the mobile device 2300 need not have touch screen capability. Additionally, the mobile device 2300 may have one or more antenna 2308 for sending and receiving electromagnetic radiation that may be connected to one or more wireless data link and/or cellular telephone transceivers 2316, such as Wi-Fi transceivers and/or CDMA, TDMA, GSM, PCS, 3G, 4G, LTE, or any other type of cellular data transceivers, coupled to the processor 2302. The mobile device 2300 may also include physical buttons 2312*a* and 2312*b* for receiving user inputs. The mobile device 2300 may also include an audio port 2318 for connecting headphones to mobile device 2300. The mobile device 2300 may also include a light sensor, such as a camera, and short range communication transceivers, such as Bluetooth® transceivers, Peanut transceivers, Wi-Fi transceivers, ANT+ transceivers, etc., one or more microphones.

Figure 24:
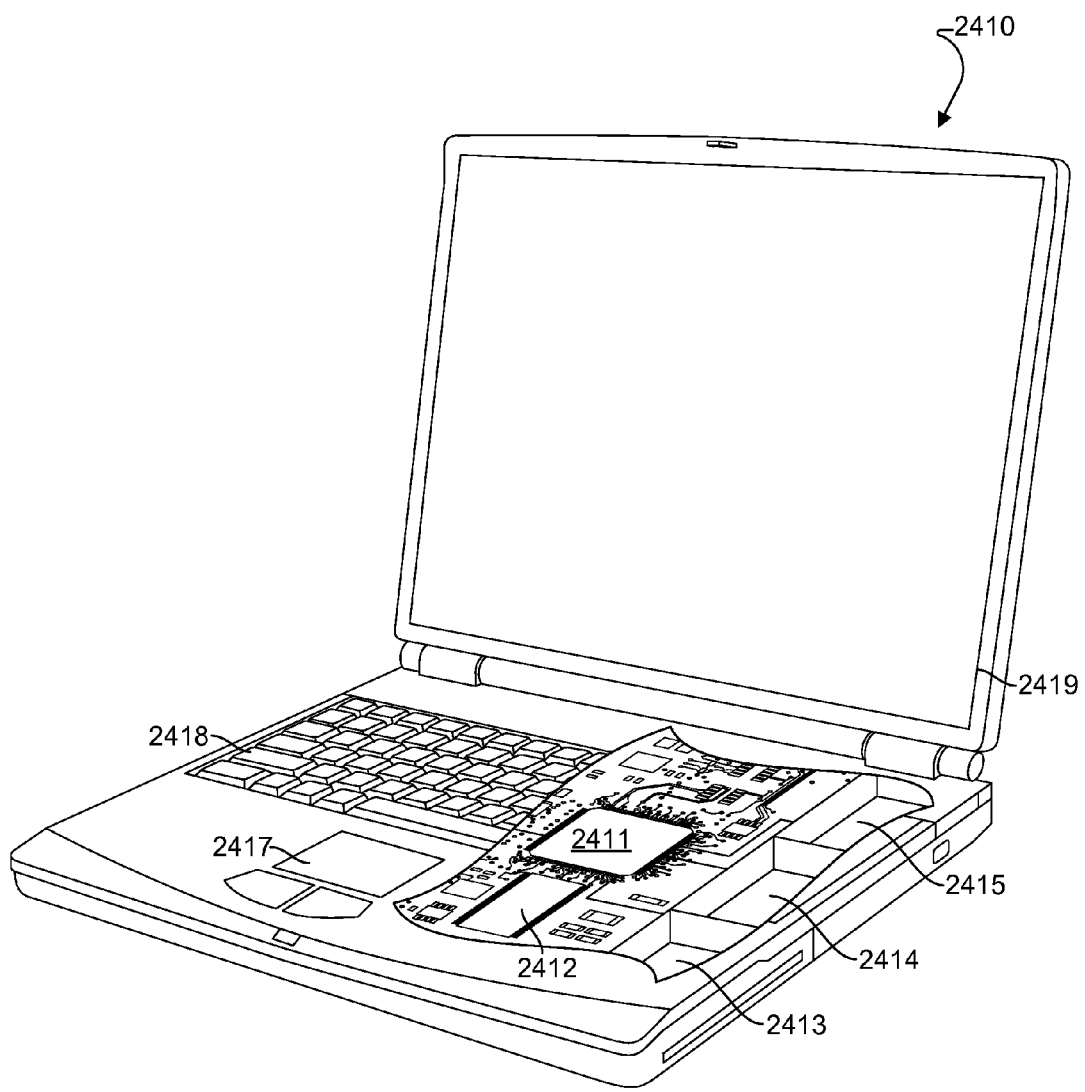
FIG. 24 is a component diagram of another example mobile device suitable for use with the various embodiments.

The various embodiments described above may also be implemented within a variety of personal computing devices, such as a laptop computer 2410 as illustrated in FIG. 24. Many laptop computers include a touch pad touch surface 2417 that serves as the computer's pointing device, and thus may receive drag, scroll, and flick gestures similar to those implemented on mobile computing devices equipped with a touch screen display and described above. A laptop computer 2410 will typically include a processor 2411 coupled to volatile memory 2412 and a large capacity nonvolatile memory, such as a disk drive 2413 of Flash memory. The computer 2410 may also include a floppy disc drive 2414 and a compact disc (CD) drive 2715 coupled to the processor 2411. The computer device 2410 may also include a number of connector ports coupled to the processor 2411 for establishing data connections or receiving external memory devices, such as a USB or FireWire® connector sockets, or other network connection circuits for coupling the processor 2411 to a network. In a notebook configuration, the computer housing includes the touchpad 2417, the keyboard 2418, and the display 2419 all coupled to the processor 2411. Other configurations of the computing device may include a computer mouse or trackball coupled to the processor (e.g., via a USB input) as are well known, which may also be use in conjunction with the various embodiments. The computer 2400 may also include an audio port for connecting headphones to the computer 2400. The computer 2400 may also include a light sensor, such as a camera, and short range communication transceivers, such as Bluetooth® transceivers, Peanut transceivers, Wi-Fi transceivers, ANT+ transceivers, etc., one or more microphones.

Figure 25:
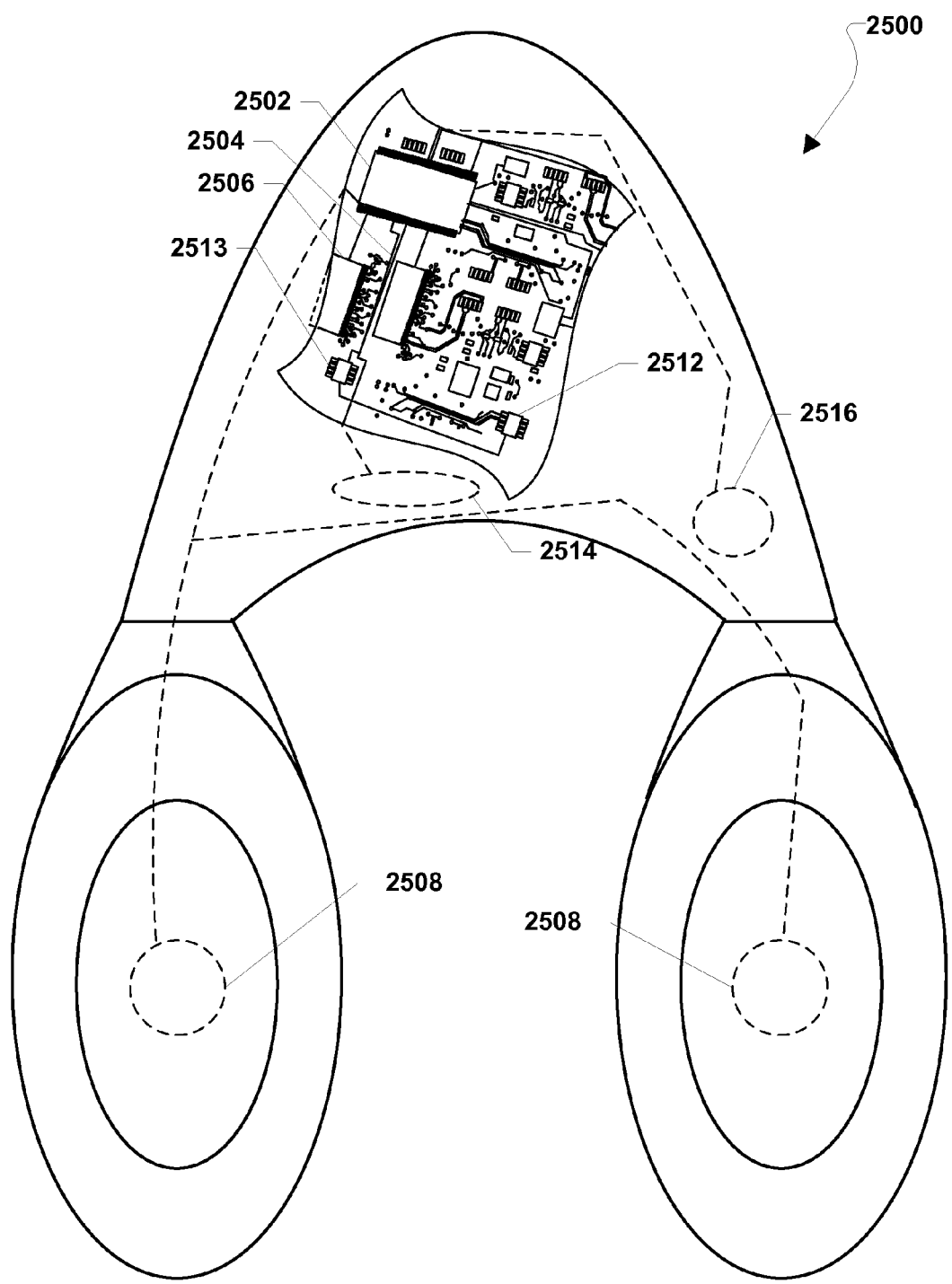
FIG. 25 is a component diagram of example headphones suitable for use with the various embodiments.

The various embodiments described above may also be implemented within a variety of headphones, such as headphones 2500 illustrated in FIG. 25. Headphones 2500 may include a processor 2502 coupled to internal memories 2504 and 2506. Internal memories 2504 and 2506 may be volatile or non-volatile memories, and may also be secure and/or encrypted memories, or unsecure and/or unencrypted memories, or any combination thereof. The headphones 2500 may include a physical button 2514 for receiving user inputs. Additionally, the headphones 2500 may have one or more antenna 2512 for sending and receiving electromagnetic radiation that may be connected to a wireless data link 2513 such as one or more Wi-Fi transceivers, Bluetooth® transceivers, Peanut transceivers, Wi-Fi transceivers, ANT+ transceivers, etc., which may be coupled to the processor 2502. The headphones 2500 may include one or more speakers 2508 coupled to the processor 2502 and configured to generate an audio output. The headphones 2500 may also include a microphone 2516 coupled to the processor 2502 to receive an audio input. In an embodiment the headphones 2500 may also include an audio port for connecting the headphones 2500 to other devices and receiving audio data. The headphones 2500 may also include a light sensor, such as a camera.

Figure 26:
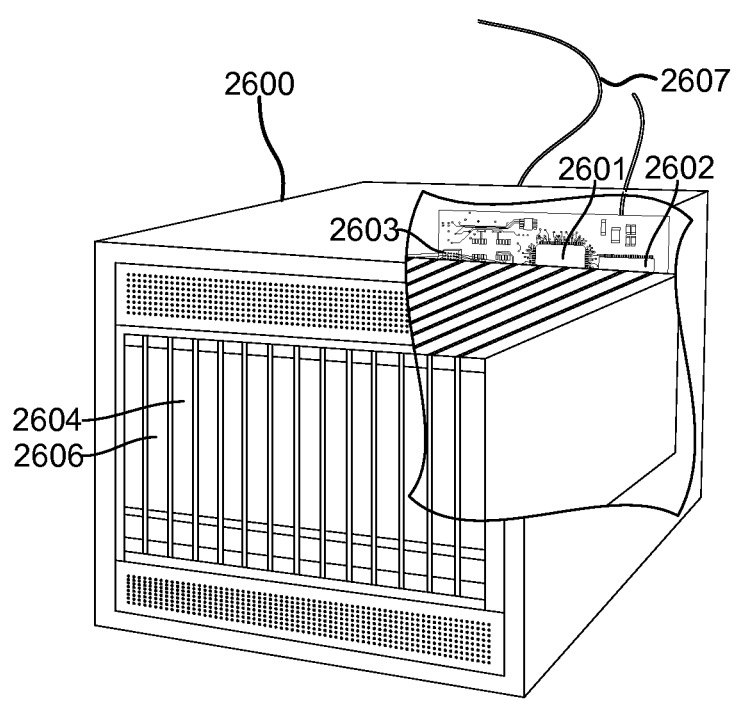
FIG. 26 is a component diagram of an example server suitable for use with the various embodiments

The various embodiments may also be implemented on any of a variety of commercially available server devices, such as the server 2600 illustrated in FIG. 26. Such a server 2600 typically includes a processor 2601 coupled to volatile memory 2602 and a large capacity nonvolatile memory, such as a disk drive 2603. The server 2600 may also include a floppy disc drive, compact disc (CD) or DVD disc drive 2604 coupled to the processor 2601. The server 2600 may also include network access ports 2606 coupled to the processor 2601 for establishing network interface connections with a network 2607, such as a local area network coupled to other announcement system computers and servers, the Internet, the public switched telephone network, and/or a cellular data network (e.g., CDMA, TDMA, GSM, PCS, 3G, 4G, LTE, or any other type of cellular data network).

The processors 2302, 2411, 2502, and 2601 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 2304, 2310, 2412, 2413, 2504, 2506, 2602, and 2603 before they are accessed and loaded into the processors 2302, 2411, 2502, and 2601. The processors 2302, 2411, 2502, and 2601 may include internal memory sufficient to store the application software instructions. In many devices the internal memory may be a volatile or nonvolatile memory, such as flash memory, or a mixture of both. For the purposes of this description, a general reference to memory refers to memory accessible by the processors 2302, 2411, 2502, and 2601 including internal memory or removable memory plugged into the device and memory within the processor 2302, 2411, 2502, and 2601 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps;

these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for ensuring that audible announcements are heard by a user wearing headphones, comprising:
    establishing a short range communication link between the headphones and an announcement system by a first wireless transceiver;
    receiving an announcement in the headphones from the announcement system via a wireless link established by a second wireless transceiver, wherein the announcement is received after establishing the short range communication link;
    determining, in a processor within the headphones, whether the short range communication link is active in response to receiving the announcement;
    determining, in the processor within the headphones, whether the announcement is relevant to a user of the headphones;
    pausing a current audio output of the headphones in response to determining that the announcement is relevant to the user and the short range communication link is active; and
    playing the announcement over the headphones in response to determining that the announcement is relevant to the user and the short range communication link is active.

2. The method of claim 1, further comprising:
    resuming the current audio output of the headphones after playing the announcement.

3. The method of claim 1, wherein the wireless link established by the second wireless transceiver comprises a Wi-Fi channel.

4. The method of claim 3, wherein:
    the announcement includes header information; and
    determining, in the processor within the headphones, whether the announcement is relevant to a user of the headphones comprises determining, in the processor within the headphones, whether the announcement is relevant to a user of the headphones based at least in part on the header information.

5. The method of claim 4, wherein the header information includes an announcement identifier or location identifier.

6. The method of claim 3, further comprising receiving a hidden service set ID from the announcement system in the headphones via the short range communication link,
    wherein the Wi-Fi channel corresponds to the hidden service set ID.

7. The method of claim 1, wherein determining, in the processor within the headphones, whether the announcement is relevant to a user of the headphones comprises:
    obtaining a profile of the user wearing the headphones; and
    determining, in the processor within the headphones, whether the announcement is relevant to the user of the headphones based at least in part on the profile of the user wearing the headphones.

8. The method of claim 1, further comprising:
scanning a barcode with a barcode scanner on the headphones or a device connected to the headphones to generate an indication of barcode information prior to receiving the announcement at the headphones;
registering the headphones with the announcement system based on the indication of barcode information prior to receiving the announcement; and
determining, in the processor within the headphones, whether the headphones are registered with the announcement system,
wherein:
pausing a current audio output of the headphones in response to determining that the announcement is relevant to the user comprises pausing a current audio output of the headphones in response to determining that the announcement is relevant to the user, the short range communication link is active, and the headphones are registered with the announcement system; and
playing the announcement over the headphones in response to determining that the announcement is relevant to the user comprises only playing the announcement over the headphones in response to determining that the announcement is relevant to the user the short range communication link is active, and the headphones are registered with the announcement system.

9. Headphones, comprising:
means for establishing a short range communication link between the headphones and an announcement system by a first wireless transceiver;
means for receiving an announcement in the headphones from the announcement system via a wireless link established by a second wireless transceiver after establishing the short range communication link;
means for determining whether the short range communication link is active in response to receiving the announcement;
means for determining whether the announcement is relevant to a user of the headphones;
means for pausing a current audio output of the headphones in response to determining that the announcement is relevant to the user and the short range communication link is active; and
means for playing the announcement over the headphones in response to determining that the announcement is relevant to the user and the short range communication link is active.

10. The headphones of claim 9, further comprising:
means for resuming the current audio output of the headphones after playing the announcement.

11. The headphones of claim 9, wherein the wireless link established by the second wireless transceiver comprises a Wi-Fi channel.

12. The headphones of claim 11, wherein:
the announcement includes header information; and
means for determining whether the announcement is relevant to a user of the headphones comprises means for determining, at the headphones, whether the announcement is relevant to a user of the headphones based at least in part on the header information.

13. The headphones of claim 12, wherein the header information includes an announcement identifier or location identifier.

14. The headphones of claim 11, further comprising means for receiving a hidden service set ID from the announcement system in the headphones via the short range communication link,
wherein the Wi-Fi channel corresponds to the hidden service set ID.

15. The headphones of claim 9, wherein means for determining whether the announcement is relevant to a user of the headphones comprises:
means for obtaining a profile of the user wearing the headphones; and
means for determining whether the announcement is relevant to the user of the headphones based at least in part on the profile of the user wearing the headphones.

16. The headphones of claim 9, further comprising:
means for scanning a barcode with a barcode scanner on the headphones or a device connected to the headphones to generate an indication of barcode information prior to receiving the announcement at the headphones;
means for registering the headphones with the announcement system based on the indication of barcode information prior to receiving the announcement; and
means for determining whether the headphones are registered with the announcement system,
wherein:
means for pausing a current audio output of the headphones in response to determining that the announcement is relevant to the user comprises means for pausing a current audio output of the headphones in response to determining that the announcement is relevant to the user, the short range communication link is active, and the headphones is registered with the announcement system; and
means for playing the announcement over the headphones in response to determining that the announcement is relevant to the user comprises means for only playing the announcement over the headphones in response to determining that the announcement is relevant to the user, the short range communication link is active, and the headphones registered with the announcement system.

17. Headphones, comprising:
a speaker; and
a processor connected to the speaker, wherein the processor is configured to:
establishing a short range communication link between the headphones and an announcement system by a first wireless transceiver;
receive an announcement from the announcement system via a wireless link established by a second wireless transceiver after establishing the short range communication link;
determine whether the short range communication link is active in response to receiving the announcement;
determine whether the announcement is relevant to a user of the headphones;
pause a current audio output of the speaker in response to determining that the announcement is relevant to the user and the short range communication link is active; and
play the announcement over the speaker in response to determining that the announcement is relevant to the user and the short range communication link is active.

18. The headphones of claim 17, wherein the first wireless transceiver and the second wireless transceiver are connected to the processor, and
wherein the processor is configured to
receive the current audio output of the speaker after playing the announcement.

19. The headphones of claim 17, wherein the wireless link established by the second wireless transceiver comprises a Wi-Fi channel.

20. The headphones of claim 19, wherein:
the announcement includes header information; and
the processor is configured to determine whether the announcement is relevant to the user of the headphones by determining, at the headphones, whether the announcement is relevant to the user of the headphones based at least in part on the header information.

21. The headphones of claim 20, wherein the header information includes an announcement identifier or location identifier.

22. The headphones of claim 19, wherein the processor is configured to:
receive a hidden service set ID from the announcement system in the headphones via the short range communication link with the short range wireless transceiver; and
receive the announcement in the headphones via the Wi-Fi channel by receiving the announcement in the headphones via the Wi-Fi channel corresponding to the hidden service set ID.

23. The headphones of claim 17, wherein the processor is configured to determine whether the announcement is relevant to the user of the headphones by:
obtaining a profile of the user wearing the headphones; and
determining whether the announcement is relevant to the user of the headphones based at least in part on the profile of the user wearing the headphones.

24. The headphones of claim 17, further comprising a barcode scanner coupled to the processor, wherein the processor is configured to:
generate an indication of barcode information of a barcode scanned by the barcode scanner prior to receiving the announcement at the headphones;
register the headphones with the announcement system based on the indication of barcode information prior to receiving the announcement;
determine whether the headphones are registered with the announcement system,
pause the current audio output of the speaker in response to determining that the announcement is relevant to the user by pausing the current audio output of the speaker in response to determining that the announcement is relevant to the user, the short range communication link is active, and the headphones are registered with the announcement system; and
play the announcement over the speaker in response to determining that the announcement is relevant to the user by only playing the announcement over the speaker in response to determining that the announcement is relevant to the user, the short range communication link is active, and the headphones are registered with the announcement system.

25. A non-transitory processor readable medium having stored thereon processor-executable instructions configured to cause a processor of headphones to perform operations comprising:

establishing a short range communication link between the headphones and an announcement system by a first wireless transceiver receiving an announcement from the announcement system via a wireless link established by a second wireless transceiver after establishing the short range communication link;
determining whether the short range communication link is active in response to receiving the announcement;
determining whether the announcement is relevant to a user of the headphones;
pausing a current audio output of the headphones in response to determining that the announcement is relevant to the user and the short range communication link is active; and
playing the announcement over the headphones in response to determining that the announcement is relevant to the user and the short range communication link is active.

26. The non-transitory processor readable medium of claim 25, wherein the stored processor-executable instructions are configured to cause a processor of headphones to perform operations further comprising
resuming the current audio output of the headphones after playing the announcement.

27. The non-transitory processor readable medium of claim 25, wherein the wireless link comprises a Wi-Fi channel.

28. The non-transitory processor readable medium of claim 27, wherein the stored processor-executable instructions are configured to cause a processor of headphones to perform operations such that:
the announcement includes header information; and
determining whether the announcement is relevant to a user of the headphones comprises determining whether the announcement is relevant to a user of the headphones based at least in part on the header information.

29. The non-transitory processor readable medium of claim 28, wherein the stored processor-executable instructions are configured to cause a processor of headphones to perform operations such that the header information includes an announcement identifier or location identifier.

30. The non-transitory processor readable medium of claim 27, wherein the stored processor-executable instructions are configured to cause a processor of headphones to perform operations further comprising receiving a hidden service set ID from the announcement system via the short range communication link, and wherein the Wi-Fi channel corresponds to the hidden service set ID.

31. The non-transitory processor readable medium of claim 25, wherein the stored processor-executable instructions are configured to cause a processor of headphones to perform operations such that determining whether the announcement is relevant to a user of the headphones comprises:
obtaining a profile of the user wearing the headphones; and
determining whether the announcement is relevant to the user of the headphones based at least in part on the profile of the user wearing the headphones.

32. The non-transitory processor readable medium of claim 25, wherein the stored processor-executable instructions are configured to cause a processor of headphones to perform operations further comprising:
generating an indication of barcode information of a barcode scanned by a barcode scanner prior to receiving the announcement at the headphones;

registering the headphones with the announcement system based on the indication of barcode information prior to receiving the announcement; and determining whether the headphones are registered with the announcement system, and wherein the stored processor-executable instructions are configured to cause a processor of headphones to perform operations such that:

pausing a current audio output of the headphones in response to determining that the announcement is relevant to the user comprises pausing a current audio output of the headphones in response to determining that the announcement is relevant to the user, the short range communication link is active, and the headphones are registered with the announcement system; and playing the announcement over the headphones in response to determining that the announcement is relevant to the user comprises only playing the announcement over the headphones in response to determining that the announcement is relevant to the user the short range communication link is active, and the headphones are registered with the announcement system.

* * * * *